United States Patent
Fujimura et al.

(10) Patent No.: US 8,507,604 B2
(45) Date of Patent: Aug. 13, 2013

(54) POLYOLEFIN GRAFT COPOLYMER AND ADHESIVE COMPOSITION

(75) Inventors: Takenori Fujimura, Chiba (JP); Ryo Aburatani, Chiba (JP); Shuji Machida, Chiba (JP); Shinichi Nakamura, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 178 days.

(21) Appl. No.: 12/922,251

(22) PCT Filed: Mar. 12, 2009

(86) PCT No.: PCT/JP2009/054795
§ 371 (c)(1),
(2), (4) Date: Sep. 13, 2010

(87) PCT Pub. No.: WO2009/113630
PCT Pub. Date: Sep. 17, 2009

(65) Prior Publication Data
US 2011/0015338 A1   Jan. 20, 2011

(30) Foreign Application Priority Data

Mar. 14, 2008 (JP) ................................. 2008-066412

(51) Int. Cl.
*C08L 51/06* (2006.01)
*C08G 63/91* (2006.01)
*C08F 4/00* (2006.01)
*C08F 293/00* (2006.01)

(52) U.S. Cl.
USPC ............. 524/547; 525/72; 525/244; 525/245; 525/246; 525/254; 525/260; 525/263; 525/268; 525/301

(58) Field of Classification Search
USPC ................. 524/547; 525/244–246, 254, 260, 525/263, 268, 72, 301
See application file for complete search history.

(56) References Cited

U.S. PATENT DOCUMENTS

| | | | |
|---|---|---|---|
| 7,459,503 B2 * | 12/2008 | Kanamaru et al. ............ | 525/386 |
| 2004/0039117 A1 | 2/2004 | Kijima | |
| 2004/0059064 A1 | 3/2004 | Usui et al. | |
| 2005/0043455 A1 | 2/2005 | Hohner | |
| 2005/0171295 A1 | 8/2005 | Kanamaru et al. | |
| 2007/0191547 A1 | 8/2007 | Sekiguchi | |
| 2008/0167421 A1* | 7/2008 | Yalvac et al. ................. | 524/570 |
| 2009/0082532 A1 | 3/2009 | Fujimura et al. | |
| 2009/0137721 A1 | 5/2009 | Fujino | |

FOREIGN PATENT DOCUMENTS

| | | |
|---|---|---|
| EP | 1 892 253 A1 | 2/2008 |
| EP | 1 980 578 A1 | 10/2008 |
| EP | 2 241 582 A1 | 10/2010 |
| JP | 51 114438 | 10/1976 |
| JP | 9 40930 | 2/1997 |
| JP | 2002 173514 | 6/2002 |
| JP | 2003 26750 | 1/2003 |
| JP | 2004 10809 | 1/2004 |
| JP | 2006 183000 | 7/2006 |
| JP | 2007 056120 | 3/2007 |
| WO | 03 087172 | 10/2003 |
| WO | WO 03087172 A1 * | 10/2003 |
| WO | 2005 082963 | 9/2005 |
| WO | 2007 007762 | 1/2007 |
| WO | 2007 008765 | 1/2007 |
| WO | 2007 091478 | 8/2007 |
| WO | WO 2007091478 A1 * | 8/2007 |

OTHER PUBLICATIONS

Extended European Search Report issued Mar. 21, 2011, in Application No. / Patent No. 09719280.1- 2109 / 2253648 PCT/JP2009054795.

* cited by examiner

*Primary Examiner* — Michael M Bernshteyn
(74) *Attorney, Agent, or Firm* — Oblon, Spivak, McClelland, Maier & Neustadt, L.L.P.

(57) ABSTRACT

A graft copolymer satisfying (a) to (e): (a) a main chain derived from one or more monomers selected from (I) an acrylic acid, (II) a methacrylic acid, (III) a vinyl ester, (IV) a styrene and (V) a vinyl group-containing silane compound, at least one kind of the monomer having a crosslinkable functional group, (b) a side chain derived from a reactive homopolymer α-olefin having a meso pentad fraction (mmmm) of from 30 to 80% by mol or a copolymer of 50% by mass or more of at least one α-olefin, (c) a graft ratio of from 1 to 150% by mass, (d) a weight average molecular weight of from 500 to 400,000, and (e) a molecular weight distribution (Mw/Mn) of from 1.5 to 4.

20 Claims, No Drawings

POLYOLEFIN GRAFT COPOLYMER AND ADHESIVE COMPOSITION

TECHNICAL FIELD

The present invention relates to a graft copolymer and an adhesive composition containing the graft copolymer, and more specifically, relates to a graft copolymer having a particular structure and an adhesive composition containing the graft copolymer having a low melting temperature, the adhesive composition being favorably used for adhesion between polyolefins and for adhesion between a polyolefin and another member.

BACKGROUND ART

Polyolefins have excellent characteristics in processability, mechanical properties, electric characteristics and the like, but involves problem on adhesion due to the low surface energy thereof. Accordingly, improvement of adhesion technique of a polyolefin as a base material, and one example thereof is development of a hot-melt adhesive. A hot-melt adhesive has such advantages that coating and drying steps can be omitted, and no solvent is scattered, as being different from a solvent type adhesive. The techniques shown below have been known as techniques relating to a hot-melt adhesive.

Patent Document 1 discloses a resin for a hot-melt adhesive containing a propylene polymer having a particular stereoregularity and a tackifier resin. Patent Document 2 discloses a reactive hot-melt adhesive containing a urethane prepolymer obtained by reacting a polyolefin resin having a particular functional group as an end group with a polyisocyanate. Patent Document 3 discloses a reactive hot-melt adhesive containing a modified polyolefin modified with an unsaturated carboxylic acid or an anhydride thereof, a polyolefin and an isocyanate compound. Patent Document 4 discloses a reactive hot-melt adhesive containing a urethane prepolymer and a metallocene polyolefin. Patent Document 5 discloses a reactive hot-melt adhesive composition formed by reacting an active hydrogen-containing graft modified material with an excessive amount of a polyisocyanate compound. Patent Document 6 discloses a particular urethane prepolymer composition having an end isocyanate group and a reactive hot-melt adhesive containing the composition. Patent Document 7 discloses modified polyolefin wax modified with a particular silane compound and a method of using the wax in a hot-melt adhesive.

However, all the aforementioned techniques are not necessarily sufficient. For example, an adhesive using the resin disclosed in Patent Document 1 is demanded to be further enhanced in adhesion strength and heat resistance after adhesion to other materials than polypropylene. The polyolefin resin disclosed in Patent Document 2 has a small number of functional groups and thus involves problem upon polymerization through reaction with polyisocyanate, and the resulting reactive hot-melt adhesive involves problem in capabilities, such as heat resistance. The adhesive disclosed in Patent Document 3 requires a high molding temperature and thus involves problem in low-temperature coating property. The adhesive disclosed in Patent Document 4 may suffer phase separation upon melting under heat due to poor compatibility between the urethane prepolymer and the metallocene polyolefin, and thus the usage thereof is restricted. The active hydrogen-containing graft modified material disclosed in Patent Document 5 involves problem in structure and production method thereof, and is demanded to be further improved in curing capability and adhesion strength of the adhesive. The adhesive disclosed in Patent Document 6 involves a problem of poor affinity with polyolefins. The modified polyolefin wax disclosed in Patent Document 7 is of a small modification amount with silane, and thus the adhesive does not have a sufficient curing capability.

As described above, conventional hot-melt adhesives have various problems. In recent years, furthermore, a hot-melt adhesive is further demanded to be improved from the standpoint of environmental issues and work environments, and for example, it is demanded to be able to coated at a relatively low temperature. A hot-melt adhesive that can be coated at a low temperature solves not only the problems in environmental issues and work environments, but also the other problems, for example, the adhesive cannot be used on a base material poor in heat resistance and is liable to be denatured. However, a resin having a high melting point is ordinarily used in the conventional hot-melt adhesives for satisfying the other capabilities. Accordingly, such a hot-melt adhesive is demanded that enables coating at a low temperature with the other capabilities of the adhesive maintained.

[Patent Document 1] WO 01/96490
[Patent Document 2] JP-A-2006-183000
[Patent Document 3] JP-A-51-114438
[Patent Document 4] JP-A-2004-10809
[Patent Document 5] JP-A-9-40930
[Patent Document 6] JP-A-2003-26750
[Patent Document 7] JP-A-2005-68423

DISCLOSURE OF THE INVENTION

Problems to be Solved by the Invention

The present invention has been made under the circumstances, and an object thereof is to provide an adhesive composition that is excellent in adhesion strength between polyolefins and between a polyolefin and another member (for example, a metal, a resin, and an inorganic material, such as glass), is excellent in flowability at a low temperature and in melting property in a low temperature range, and is excellent in heat resistance after adhesion.

Means for Solving the Problems

As a result of earnest investigations made by the inventors for achieving the object, it has been found that the use of a particular reactive polyolefin provides an olefin graft copolymer that has a homogeneous composition and high flowability, and the characteristics of the graft copolymer, such as the molecular weight distribution, the compositional distribution, and the melting temperature, satisfy the required performance of a reactive hot-melt adhesive. The present invention has been completed based on the knowledge. Accordingly, the present invention provides the following graft copolymers and adhesive compositions.

1. A graft copolymer satisfying the following items (a) to (e):
    the graft copolymer having:
    (a) a main chain that is derived from one kind or two or more kinds of monomers selected from (I) acrylic acid and a derivative thereof, (II) methacrylic acid and a derivative thereof, (III) a vinyl ester and a derivative thereof, (IV) styrene and a derivative thereof and (V) a vinyl group-containing silane compound, at least one kind of the a monomer having a crosslinkable functional group,
    (b) a side chain that is derived from a reactive polyolefin having a meso pentad fraction (mmmm) of from 30 to 80% by mol and having an end unsaturated group in an amount of from 0.5 to 1.0 group per one molecule, the reactive polyolefin being a homopolymer of one kind of an α-olefin having from 3 to 28 carbon atoms, a copolymer of two or more kinds of α-olefins having from 3 to 28 carbon atoms, or a copolymer of 50% by mass or more of at least one of an α-olefin having from 3 to 28 carbon atoms and 50% by mass or less of ethylene, (c) a graft ratio of from 1 to 150% by mass, (d) a weight average molecular weight of from 500 to 400,000 measured by GPC, and (e) a molecular weight distribution (Mw/Mn) of from 1.5 to 4.

2. A graft copolymer satisfying the following items (a') and (b) to (e):

the graft copolymer having:

(a') a main chain that is derived from at least one kind of a monomer selected from the following group A and at least one kind of a monomer selected from the following group B, at least one kind of the monomers having a crosslinkable functional group, group A: (VI) maleic anhydride and a substituted product thereof, (VII) maleic acid and an ester thereof and (VIII) maleimide and a substituted product thereof, group B: (I) acrylic acid and a derivative thereof, (II) methacrylic acid and a derivative thereof, (III) a vinyl ester and a derivative thereof, (IV) styrene and a derivative thereof, (V) a vinyl group-containing silane compound and (IX) an α-olefin, (b) a side chain that is derived from a reactive polyolefin having a meso pentad fraction (mmmm) of from 30 to 80% by mol and having an end unsaturated group in an amount of from 0.5 to 1.0 group per one molecule, the reactive polyolefin being a homopolymer of one kind of an α-olefin having from 3 to 28 carbon atoms, a copolymer of two or more kinds of α-olefins having from 3 to 28 carbon atoms, or a copolymer of 50% by mass or more of at least one kind of an α-olefin having from 3 to 28 carbon atoms and 50% by mass or less of ethylene, (c) a graft ratio of from 1 to 150% by mass, (d) a weight average molecular weight of from 500 to 400,000 measured by GPC, and (e) a molecular weight distribution (Mw/Mn) of from 1.5 to 4.

3. The graft copolymer according to the item 1, wherein the crosslinkable functional group is a group selected from a carboxylic acid group, a carboxylic anhydride group, a hydroxyl group, an amino group, an epoxy group, an isocyanate group and an alkoxysilicon group.

4. The graft copolymer according to the item 1, wherein the reactive polyolefin is one that is produced with a metallocene catalyst.

5. The graft copolymer according to the item 4, wherein the metallocene catalyst is a polymerization catalyst containing a transition metal compound represented by the general formula (I)

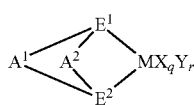

(I)

wherein M represents a metal element of Groups 3 to 10 in Periodic Table or lanthanoid series; $E^1$ and $E^2$ each represent a ligand selected from a substituted cyclopentadienyl group, an indenyl group, a substituted indenyl group, a heterocyclopentadienyl group, a substituted heterocyclopentadienyl group, an amide group, a phosphide group, a hydrocarbon group and a silicon-containing group, and forms a crosslinked structure through $A^1$ and $A^2$, provided that $E^1$ and $E^2$ may be the same as or different from each other; X represents a σ bonding ligand, provided that when there are plural groups of X, plural groups of X may be the same as or different from each other, and each may be crosslinked with the other group of X, $E^1$, $E^2$ or Y; Y represents a Lewis base, provided that when there are plural groups of Y, plural groups of Y may be the same as or different from each other, and each may be crosslinked with the other group of Y, $E^1$, $E^2$ or X; $A^1$ and $A^2$ each represents a divalent crosslinking group bonding two ligands, and represents a hydrocarbon group having from 1 to 20 carbon atoms, a halogen-containing hydrocarbon group having from 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$—, wherein $R^1$ represents a hydrogen atom, a halogen atom, a hydrocarbon group having from 1 to 20 carbon atoms or a halogen-containing hydrocarbon group having from 1 to 20 carbon atoms, provided that $A^1$ and $A^2$ may be the same as or different from each other; q represents an integer of from 1 to 5, which is ((atomic valence of M)−2); and r represents an integer of from 0 to 3.

6. A reactive hot-melt adhesive containing the graft copolymer according to the item 1 or 3.

7. The reactive hot-melt adhesive according to the item 6, wherein the reactive hot-melt adhesive contains a crosslinking agent having a functional group that reacts with the crosslinkable functional group of the graft copolymer in an amount of 2 or more groups per one molecule.

8. The reactive hot-melt adhesive according to the item 7, wherein the functional group of the crosslinking agent that reacts with the crosslinkable functional group of the graft copolymer is at least one kind of a functional group selected from a carboxylic acid group, a carboxylic anhydride group, a hydroxyl group, an amino group, an isocyanate group and an epoxy group.

9. The reactive hot-melt adhesive according to the item 8, wherein the crosslinkable functional group of the graft copolymer is an alkoxysilicon group.

10. The reactive hot-melt adhesive according to the item 9, wherein the reactive hot-melt adhesive contains water and a curing catalyst.

11. The reactive hot-melt adhesive according to the item 6, wherein the reactive hot-melt adhesive contains at least one kind selected from oil, a polyolefin resin, a tackifier and an inorganic filler.

Advantages of the Invention

The present invention provides a graft copolymer having a particular structure and a reactive hot-melt adhesive containing the graft copolymer. The reactive hot-melt adhesive is excellent in adhesion strength between polyolefins and between a polyolefin and another member (for example, a metal, a resin, and an inorganic material, such as glass), is excellent in flowability at a low temperature and in melting property in a low temperature range, and is excellent in heat resistance after adhesion, and the reactive hot-melt adhesive is favorably used upon adhering polyolefins.

BEST MODE FOR CARRYING OUT THE INVENTION

The graft copolymer of the present invention is obtained by performing graft copolymerization reaction with a particular reactive polyolefin and a particular monomer.

In the present specification, the term "reactive polyolefin" means a polyolefin that forms a graft copolymer efficiently with a radical initiator, and specifically means a polyolefin that has 0.5 or more end unsaturated group per one molecule.

As understood from the aforementioned definition, all the molecules contained in the reactive polyolefin do not necessarily have an end unsaturated group and have reactivity. Accordingly, an unreacted polyolefin may remain after completing the graft copolymerization reaction, but the amount of the unreacted polyolefin can be decreased by controlling the amount of the end unsaturated group and by a purifying step. Therefore, a product of the graft copolymerization reaction is not expressed by "composition" but is referred to as "graft copolymer".

Graft Copolymer

The graft copolymer of the present invention has a main chain derived from a particular monomer. In the synthesis of the graft copolymer I, one kind or two or more kinds of monomers selected from (I) to (V) below, and the monomer is polymerized to form the main chain of the graft copolymer I.

(I) Acrylic Acid and Derivative Thereof (1) Acrylic acid.

(2) An acrylate ester, such as methyl acrylate, ethyl acrylate, butyl acrylate, n-octyl acrylate, 2-ethylhexyl acrylate and an acryloxyalkyltrialkoxysilane (specific examples thereof include acryloxypropyltrimethoxysilane and acryloxypropyltriethoxysilane, preferably one having an alkoxy group having 6 or less carbon atoms, and most preferably acryloxypropyltrimethoxysilane and acryloxypropyltriethoxysilane).

(3) A metal acrylate salt containing acrylic acid and a representative metal element, such as sodium acrylate, potassium acrylate, magnesium acrylate and calcium acrylate.

(4) An acrylate ester having a functional group, such as an acrylate ester having an oxygen, nitrogen, sulfur or silicon atom at the ester portion, for example, glycidyl acrylate, 2-hydroxyethyl acrylate and acryloyloxyethyl isocyanate.

(II) Methacrylic Acid and Derivative Thereof

Examples thereof include a monomer containing the monomer (I) having an alkyl group, such as a methyl group, at the α-position thereof. The alkyl group is preferably an alkyl group having from 1 to 6 carbon atoms, and more preferably an alkyl group having 1 or 2 carbon atoms. Specific examples of the monomer of (II) include methyl methacrylate, methacryloyloxyethyl isocyanate and a methacryloyloxyalkyltrialkoxysilane (specific examples thereof include methacryloxypropyltrimethoxysilane and methacryloxypropyltriethoxysilane, preferably one having an alkoxy group having 6 or less carbon atoms, and most preferably methacryloxypropyltrimethoxysilane and methacryloxypropyltriethoxysilane).

(III) Vinyl Ester and Derivative Thereof

Specific examples thereof include vinyl acetate, vinyl propionate, vinyl isobutyrate, vinyl pivalate, vinyl undecanoate and vinyl palmitate.

(IV) Styrene and Derivative Thereof

Specific examples thereof include styrene, an alkylstyrene, such as α-methylstyrene, p-methylstyrene, p-ethylstyrene, p-propylstyrene, p-isopropylstyrene, p-butylstyrene, p-tert-butylstyrene, p-phenylstyrene, o-methylstyrene, o-ethylstyrene, o-propylstyrene, o-isopropylstyrene, m-methylstyrene, m-ethylstyrene, m-isopropylstyrene, m-butylstyrene, mesitylstyrene, 2,4-dimethylstyrene, 2,5-dimethylstyrene and 3,5-dimethylstyrene; an alkoxystyrene, such as p-methoxystyrene, o-methoxystyrene and m-methoxystyrene; a halogenated styrene, such as p-chlorostyrene, m-chlorostyrene, o-bromostyrene, p-fluorostyrene, m-fluorostyrene, o-fluorostyrene and o-methyl-p-fluorostyrene; trimethylsilylstyrene, and vinyl benzoate.

(V) Vinyl Group-Containing Silane Compound

The vinyl group-containing silane compound is a silane compound that is represented by the general formula: $H_2C=C(H)SiX_3$. In the formula, X represents an arbitrary hydrolyzable organic group, and examples thereof include an alkoxy group, such as a methoxy group, an ethoxy group and a butoxy group, an acyloxy group, such as a formyloxy group, an acetoxy group and a propionyloxy group, an oxime group, and a substituted amino group, such as an alkylamino group and an arylamino group. The vinyl group-containing silane compound of the present invention is preferably an alkoxyvinylsilane, wherein X is an alkoxy group, and more preferably an alkoxyvinylsilane, wherein X is an alkoxy group having 6 or less carbon atoms. Specific examples of the vinyl group-containing silane compound include vinyltrimethoxysilane and vinyltriethoxysilane.

In the synthesis of the graft copolymer I, one kind or two or more kinds selected from (I) to (V) may be used as a monomer.

Preferred examples of the monomer and the combination of monomers include the following.

Preferred examples of the acrylic acid and a derivative thereof (I) include all the compounds mentioned above, and all the compounds except for the metal acrylate salts are particularly preferred.

The graft copolymerization can be performed only with the methacrylic acid and a derivative thereof (II), and a combination of the acrylic acid and a derivative thereof (I) and the methacrylic acid and a derivative thereof (II) is preferred since the graft polymerization amount of the methacrylic acid and a derivative thereof (II) is increased.

In particular, a combination of acrylic acid or an acrylate ester with methacrylic acid or a methacrylate ester is preferred, in which the ratio (I)/(II) (by mol) is in a range of from 0.1 to 2, preferably from 0.2 to 1.5, more preferably from 0.3 to 1.2, and further preferably from 0.5 to 1.0.

In the case where the ratio (I)/(II) (by mol) is 0.1 or more, it is preferred since the graft polymerization amount of the methacrylic acid and a derivative thereof (II) is increased, and in the case where the ratio is 2 or less, it is preferred since a copolymer containing the acrylic acid and a derivative thereof (I) and the methacrylic acid and a derivative thereof (II) that do not participate in the graft copolymerization is not by-produced.

The graft copolymerization can be performed only with the styrene and a derivative thereof (IV), and a combination of the acrylic acid and a derivative thereof (I) and the styrene and a derivative thereof (IV) is preferred since the graft polymerization amount of the styrene and a derivative thereof (IV) is increased.

In particular, a combination of acrylic acid or an acrylate ester with styrene or a derivative thereof (IV) is preferred, in which the ratio (I)/(IV) (by mol) is in a range of from 0.1 to 2, preferably from 0.2 to 1.5, more preferably from 0.3 to 1.2, and further preferably from 0.5 to 1.0.

In the case where the ratio (I)/(IV) (by mol) is 0.1 or more, it is preferred since the graft polymerization amount of the styrene and a derivative thereof (IV) is increased, and in the case where the ratio is 2 or less, it is preferred since a copolymer containing the acrylic acid and a derivative thereof (I) and the styrene and a derivative thereof (IV) that do not participate in the graft copolymerization is not by-produced.

In the synthesis of the graft copolymer II, at least one kind of a monomer selected from the following group A and at least one kind of a monomer selected from the following group B are used, and the monomers are polymerized to form the main chain of the graft copolymer II.

Examples of the monomers of the group A and the group B include the following.

Group A:
(VI) maleic anhydride and a substituted product thereof
(VII) maleic acid and an ester thereof
(VIII) maleimide and a substituted product thereof.

Group B:
(I) acrylic acid and a derivative thereof
(II) methacrylic acid and a derivative thereof
(III) a vinyl ester and a derivative thereof
(IV) styrene and a derivative thereof
(V) a vinyl group-containing silane compound
(IX) an α-olefin The compounds of (I), (II), (III), (IV) and (V) have been described above.

(VI) Maleic Anhydride and Substituted Product Thereof

Specific examples thereof include maleic anhydride, methylmaleic anhydride, dimethylmaleic anhydride, phenylmaleic anhydride and diphenylmaleic anhydride.

(VII) Maleic Acid and Ester Thereof

Specific examples thereof include maleic acid, methylmaleic acid, dimethyl maleate, diethyl maleate, dibutyl maleate and monomethyl maleate.

(VIII) Maleimide and Substituted Product Thereof

Specific examples thereof include maleimide, N-alkyl-substituted maleimide, N-methylmaleimide, N-ethylmaleimide and N-phenylmaleimide.

(IX) α-Olefin

Specific examples thereof include ethylene, propylene, 1-butene, 1-hexene, 1-heptene, 1-octene, 1-decene, 1-undecene, 1-dodecene, 1-tridecene, 1-tetradecene, 1-pentadecene, 1-hexadecene, 1-heptadecene, 1-octadecene, 1-nonadecene and 1-eicosene, and preferably an α-olefin having from 2 to 28 carbon atoms.

The α-olefin is selected in consideration of the graft copolymerization temperature and the boiling point thereof. In melt graft copolymerization, when the temperature is higher, an α-olefin having a higher boiling point is favorable in handleability in reaction operation. In graft copolymerization using a solvent, any α-olefin of from one in a gaseous state to one having a high boiling point may be used.

In the combination of the compound of the group A and the compound of the group B, the ratio of the compound of the group A/the compound of the group B (by mol) is generally in a range of approximately from 0.1 to 2, preferably from 0.5 to 1.5, more preferably from 0.8 to 1.2, and further preferably from 0.9 to 1.1.

In the case where the molar ratio is 0.1 or more, it is preferred since the graft polymerization amount of the compound of the group A is increased, and in the case where the ratio is 2 or less, it is preferred since a copolymer containing the compound of the group A and the compound of the group B that do not participate in the graft copolymerization is not by-produced.

Preferred examples of the combination of the compound of the group A and the compound of the group B include a combination of the maleic anhydride and a substituted product thereof (VI) of the group A and the compound of the group B, and more preferably a combination of the maleic anhydride (VI) of the group A and acrylic acid and a derivative thereof (I), the vinyl ester and a derivative thereof (III), the vinyl group-containing silane compound (V) or the α-olefin (IX) of the group B.

The graft copolymer I and the graft copolymer II contain a crosslinkable functional group in the main chain. Accordingly, at least one of the monomers (I) to (V) is a monomer having a crosslinkable functional group upon synthesizing the graft copolymer I, and at least one of the monomers of the group A and the group B is a monomer having a crosslinkable functional group upon synthesizing the graft copolymer II. The crosslinkable functional group herein is a functional group forming a bond between the graft copolymers or between the graft copolymer and a crosslinking agent described later.

Examples of the crosslinkable functional group include a carboxylic acid group, a carboxylic anhydride group, a hydroxyl group, an amino group, an epoxy group, an isocyanate group and an alkoxysilicon group. The crosslinkable group may be used solely or in combination of two or more kinds thereof. Preferred examples of the combination upon forming crosslinking include a combination of alkoxysilicon groups, a combination of a carboxylic acid group and an alkoxysilicon group, and a combination of a carboxylic anhydride group and an alkoxysilicon group.

The amount of the monomer unit having a crosslinkable functional group in the main chain is preferably from 0.01 to 50% by mol, and more preferably from 0.1 to 40% by mol, based on the total amount of the monomer units in the main chain. The adhesion force of the reactive hot-melt adhesive is enhanced within the range.

In the graft copolymer I and the graft copolymer II, the side chain thereof is derived from a particular reactive polyolefin having features in stereoregularity and end unsaturated group thereof. Specifically, the monomers for the main chain (i.e., the monomers (I) to (V) or the monomers of the group A and the group B) are polymerized in the presence of the reactive polyolefin, whereby the end double bonds of the reactive polyolefin are reacted to form the graft copolymer of the present invention.

The reactive polyolefin used in the present invention is a homopolymer of an α-olefin having from 3 to 28 carbon atoms or a copolymer of two or more kinds thereof, or a copolymer of 50% by mass or more of an α-olefin having from 3 to 28 carbon atoms and 50% by mass or less of ethylene. The copolymer of an α-olefin having from 3 to 28 carbon atoms and ethylene is more preferably a copolymer of 92% by mass or more of an α-olefin having from 3 to 28 carbon atoms and 8% by mass or less of ethylene, and further preferably a copolymer of 95% by mass or more of an α-olefin having from 3 to 28 carbon atoms and 5% by mass or less of ethylene.

Preferred examples of the reactive polyolefin in the present invention include a propylene homopolymer and a propylene copolymer containing 90% by mass or more of propylene and 10% by mass or less of at least one selected from ethylene and an α-olefin having from 4 to 28 carbon atoms.

The propylene copolymer is more preferably a propylene copolymer containing 92% by mass or more of propylene and 8% by mass or less of at least one selected from ethylene and an α-olefin having from 4 to 28 carbon atoms, and further preferably a propylene copolymer containing 95% by mass or more of propylene and 5% by mass or less of at least one selected from ethylene and an α-olefin having from 4 to 28 carbon atoms.

Examples of the α-olefin having from 3 to 28 carbon atoms include propylene, 1-butene, 1-pentene, 4-methylpentene-1, 1-hexene, 1-octene, 1-decene, 1-undecene, 1-dodecene, 1-tridecene, 1-tetradecene, 1-pentadecene, 1-hexadecene, 1-heptadecene, 1-octadecene, 1-nonadecene and 1-eicosene.

The reactive polyolefin used in the present invention has a meso pentad fraction (mmmm) of from 30 to 80% by mol. The meso pentad fraction (mmmm) is preferably from 30 to 75% by mol, and more preferably from 32 to 70% by mol.

In the case where the meso pentad fraction is less than 30% by mol, the heat resistance and the mechanical property are decreased, and in the case where it exceeds 80% by mol, the adhesion property and the impact strength are decreased, and the melting temperature is increased.

Stereoregularity of a polymer containing polypropylene as a major component is determined in the following manner.

The meso pentad fraction (mmmm), and the racemic pentad fraction (rrrr) and the racemic meso pentad fraction (rmrm) described later are a meso fraction, a racemic fraction and a racemic meso fraction, respectively, in terms of pentad unit in the polypropylene molecular chain measured with the signal of methyl groups in the $^{13}$C-NMR spectrum according to the method proposed by A. Zambelli, et al., Macromolecules, vol. 6, p. 925 (1973).

The larger the meso pentad fraction (mmmm) is, the higher the stereoregularity is.

The measurement of the $^{13}$C-NMR spectrum may be performed according to the attribution of peaks proposed by A. Zambelli, et al., Macromolecules, vol. 8, p. 687 (1975), with the apparatus and conditions shown below.

The meso triad fraction (mm), the racemic triad fraction (rr) and the meso racemic fraction (mr) described later are also calculated in the aforementioned manner.
Apparatus: $^{13}$C-NMR apparatus, Model JNM-EX400, producedby JEOL Ltd.
Method: proton complete decoupling method
Concentration: 220 mg/mL
Solvent: mixed solvent of 1,2,4-trichlorobenzene and deuterated benzene, 90/10 (by volume)
Temperature: 130° C.
Pulse width: 45°
Pulse repetition time: 4 seconds
Accumulation: 10,000 times
Calculation Expression $M=(m/S) \times 100$ $R=(\gamma/S) \times 100$ $S=P\beta\beta+P\alpha\beta+P\alpha\gamma$ S: signal intensity of side chain methyl carbon atoms of all propylene units
Pββ: 19.8-22.5 ppm
Pαβ: 18.0-17.5 ppm
Pαγ: 17.5-17.1 ppm
γ: racemic pentad chain: 20.7-20.3 ppm
m: meso pentad chain: 21.7-22.5 ppm Stereoregularity of a polymer containing polybutene as a major component is determined in the following manner.

The meso pentad fraction (mmmm) and the abnormal insertion content (1,4-insertion fraction) are obtained according to the method proposed by Asakura, et al., Polymer Journal, vol. 16, p. 717 (1984), J. Randall, et al., Macromol. Chem. Phys., vol. C29, p. 201 (1989), and V. Busico, et al., Macromol. Chem. Phys., vol. 198, p. 1257 (1997).

Specifically, the signal of methylene groups and methine groups are measured by the $^{13}$C-NMR spectrum, thereby obtaining the meso pentad fraction and the abnormal insertion content in the molecule of poly(1-butene).

The measurement of $^{13}$C-NMR spectrum is performed by the apparatus and the conditions described above.

The stereoregularity index ((mmmm)/(mmrr+rmmr)) is calculated from the values of (mmmm), (mmrr) and (rmmr) measured according to the aforementioned methods.

The racemic triad fraction (rr) is also measured according to the aforementioned method.

The homopolymer or copolymer of 1-butene has a stereoregularity index ((mmmm)/(mmrr+rmmmr)) of 20 or less, preferably 18 or less, and more preferably 15 or less.

A stereoregularity index exceeding 20 lowers the flexibility.

Stereoregularity of a polymer containing an α-olefin having 5 or more carbon atoms as a major component is determined in the following manner.

The stereoregularity index $M_2$ is obtained according to the method proposed by T. Asakura, M. Demura and Y. Nishiyama, Macromolecules, vol. 24, p. 2334 (1991).

Specifically, $M_2$ can be obtained by utilizing such a phenomenon that in the $^{13}$C-NMR spectrum, the $CH_2$ carbon on the a-position of the side chain derived from a higher α-olefin is observed as being divided as a result of difference in stereoregularity.

The value $M_2$ can be replaced by the meso pentad fraction (mmmm) in the present invention.

The larger the value is, the higher the isotacticity is.

The measurement apparatus and conditions for the $^{13}$C-NMR spectrum are the same as above, and the stereoregularity index $M_2$ is obtained in the following manner.

Six large peaks based on the mixed solvent appear at 127 to 135 ppm. The fourth peak among the peaks from the low magnetic field side is designated as 131.1 ppm and used as the standard of chemical shift.

In this case, an absorption peak based on the $CH_2$ carbon on the α-position of the side chain is observed around 34 to 37 ppm.

The value $M_2$ (% by mol) is obtained by the following expression.

$M_2$=((integrated intensity at 36.2-35.3 ppm)/(integrated intensity at 36.2-34.5 ppm))×100

The reactive polyolefin of the present invention has an end unsaturated group in an amount of from 0.5 to 1.0 group, preferably from 0.6 to 1.0 group, more preferably from 0.7 to 1.0 group, and further preferably from 0.8 to 1.0 group, per one molecule.

In the case where the amount of the end unsaturated group is less than 0.5 group, the concentration of the unsaturated group is lowered, and the formation efficiency of the graft copolymer is lowered.

Preferred examples of the end unsaturated group include a vinylidene group, and the proportion of a vinylidene group in the end unsaturated group is generally from 50 to 100% by mol, preferably from 60 to 100% by mol, more preferably from 70 to 100% by mol, and further preferably from 80 to 100% by mol.

The reactive polyolefin used in the present invention contains substantially no such a component that has two or more unsaturated groups per one molecule, for example, no such a component that has unsaturated groups on both ends thereof.

A component having two or more unsaturated groups per one molecule functions as a so-called crosslinking agent, and is not preferred since the component forms a crosslinked structure (H-shaped structure) upon graft polymerization, thereby by-producing a gel component.

Accordingly, an unsaturated polypropylene produced by thermal decomposition or the like cannot be used.

The end unsaturated group can be generally measured by any of an infrared ray absorption spectrum method, a nuclear magnetic resonance spectrum method, a bromination method or the like.

The infrared ray absorption spectrum method may be performed according to the method disclosed in "Shinpan Kobunshi Bunseki Handbook" (Polymer Analysis Handbook, New Edition), edited by Advisory Committee on Polymer Analysis, The Japan Society for Analytical Chemistry.

According to the reference, in the quantitative determination method for an end unsaturated group by the infrared ray absorption spectrum method, the unsaturated group, such as a vinyl group, a vinylidene group and a trans (vinylene) group, can be quantitatively determined by absorption at 910 $cm^{-1}$, 888 $cm^{-1}$ and 963 $cm^{-1}$ in the infrared ray absorption spectrum.

A vinylidene unsaturated group can be quantitatively determined by the nuclear magnetic resonance spectrum method in the following manner.

The number of end unsaturated groups that are vinylidene groups can be obtained by measurement of $^1$H-NMR in an ordinary method.

The content of vinylidene groups (C) (% by mol) is calculated by an ordinary method based on vinylidene groups appearing at δ 4.8 to 4.6 (2H) on the $^1$H-NMR spectrum obtained.

The number of vinylidene groups per one molecule is calculated from the number average molecular weight (Mn) obtained by gel permeation chromatography (GPC) and the molecular weight of the monomer (M) according to the following expression.

Number of end vinylidene groups per one molecule=(Mn/M)×(C/100)

Examples of the method according to the nuclear magnetic resonance spectrum method include a method based on quantitative determination of end groups. In this method, specifically, the end groups formed by polymerization reaction and the amount thereof are measured by $^1$H-NMR and $^{13}$C-NMR, and the number of end vinylidene groups per one molecule is calculated from the ratio of the end vinylidene groups with respect to the total amount of the end groups.

The case of a propylene polymer will be shown as an example.

Analysis of Amount of Unsaturated End Groups by $^1$H-NMR

A propylene polymer has (2) a methylene group of a vinylidene group (4.8 to 4.6 ppm) and (1) a methylene group of a vinyl group (5.10 to 4.90 ppm) observed. The ratio with respect to the total propylene polymer can be calculated by the following expression, in which (3) is the peak intensity corresponding to the methine, methylene and methyl groups of the propylene chain (0.6 to 2.3 ppm).

End vinylidene group amount (A)=((2)/2)/(((3)+4×(1)/2+3×(2)/2)/6)×100 unit:% by mol End vinyl group amount (B)=((1)/2)/(((3)+4×(1)/2+3×(2)/2)/6)×100 unit:% by mol Analysis of End Group Fraction by $^{13}$C-NMR The propylene polymer of the present invention has (5) an end methyl group of a n-propyl end (around 14.5 ppm), (6) an end methyl group of a n-butyl end (around 14.0 ppm), (4) a methine group of an iso-butyl end (around 25.9 ppm) and (7) a methylene group of a vinylidene end (around 111.7 ppm) observed. The peak intensity of the amount of the end vinyl group in $^{13}$C-NMR is calculated from (A) and (B) obtained from $^1$H-NMR spectrum in the following manner.

Peak intensity of end vinyl group in $^{13}$C-NMR=(B)/(A)×7

Herein, the total concentration (T) of the end groups is expressed as follows.

T=(B)/(A)×(7)+(4)+(5)+(6)+(7)

Accordingly, the proportions of the end groups are as follows.

end vinylidene group=(7)/T×100     (C)

end vinyl group=(B)/(A)×(7)×100     (D)

n-propyl end=(5)/T×100     (E)

n-butyl end=(6)/T×100     (F)

iso-butyl end=(4)/T×100     (G)

unit:% by mol

The number of end vinylidene groups per one molecule is 2×(C)/100 (unit: number per molecule).

The reactive polyolefin preferably has a molecular weight distribution (Mw/Mn) of 4 or less, more preferably 3.5 or less, further preferably 3 or less, and still further preferably 2.5 or less.

The molecular weight distribution is preferably as narrow as possible, and this is because in this case, the reactive polyolefin forms a chain in the graft copolymer used in the present invention, and the graft copolymer has less fluctuation in side chain length (chain length) with well-controlled structure. The molecular weight distribution can be measured by the method described for the production of the graft copolymer.

The reactive polyolefin preferably has a limiting viscosity (η) measured in decalin at 135° C. of from 0.01 to 2.5 dL/g, more preferably from 0.05 to 2.5 dL/g, particularly preferably from 0.05 to 2.0 dL/g, further preferably from 0.1 to 2.0 dl/g, and most preferably from 0.15 to 1.8 dL/g.

In the case where the limiting viscosity (η) is in the range, the graft copolymer has a sufficient polyolefin side chain length (chain length), and excellent adhesion property is obtained. Furthermore, the radical polymerizability upon graft polymerization is enhanced owing to the high end unsaturated group concentration.

The limiting viscosity (η) is obtained in such a manner that the reduced viscosity ($\eta_{sp}$/C) is measured with an Ubbelohde viscometer in decalin at 135° C., and the limiting viscosity (η) is calculated by the following general expression (Huggins expression).

$\eta_{sp}/c=[\eta]+K[\eta]^2c$ $\eta_{sp}$/c (dL/g): reduced viscosity
[η](dL/g): limiting viscosity
c (g/dL): polymer concentration
K=0.35 (Huggins coefficient)

The reactive polyolefin preferably satisfies the following expression.

Racemic meso racemic meso fraction (rmrm)>2.5% by mol

In the case where the racemic meso racemic meso fraction (rmrm) of the reactive polyolefin exceeds 2.5% by mol, the randomness is increased, and the transparency is further enhanced.

The reactive polyolefin preferably satisfies the following relationship between the melting point (Tm, unit: ° C.) measured with a differential scanning calorimeter (DSC) and (mmmm).

$$1.76(mmmm)-25.0 \leq Tm \leq 1.76(mmmm)+5.0$$

The relational expression between the melting point (Tm, unit: ° C.) measured with a differential scanning calorimeter (DSC) and (mmmm) shows the homogeneity of the meso pentad fraction of the reactive polyolefin.

The case where the reactive polyolefin has high homogeneity in stereoregularity, i.e., the case where a narrow stereoregularity distribution, shows that the side chain of the graft copolymer has high homogeneity, and the compatibility with a polypropylene resin or the like is enhanced. In the case where one having a high meso pentad fraction and one having a low meso pentad fraction are mixed or in the case where they are bonded as blocks, i.e., in the case where the stereoregularity distribution is broad, it is not preferred since the compatibility with a polypropylene resin or the like is lowered. The (mmmm) is measured as an average value and cannot be clearly distinguished between the case of a broad stereoregularity distribution and the case of a narrow stereoregularity distribution, but the favorable propylene polymer with high reactivity can be defined by limiting the relationship with the melting point (Tm) to the particular range.

The case where the melting point (Tm) exceeds (1.76 (mmmm)+5.0) shows that there are partially a portion with high stereoregularity and a portion with no stereoregularity.

In the case where the melting point (Tm) is less than (1.76 (mmmm)−25.0), the heat resistance may not be insufficient.

In view of the above viewpoints, the relationship $$1.76(mmmm)-20.0 \leq Tm \leq 1.76(mmmm)+3.0$$

is preferably satisfied, and the relationship $$1.76(mmmm)-15.0 \leq Tm \leq 1.76(mmmm)+2.0$$

is more preferably satisfied.

The melting point (Tm) is obtained by a DSC measurement.

Under a nitrogen atmosphere, 10 mg of a specimen is increased in temperature from 25° C. to 220° C. at a rate of 320° C. per minute, maintained at 220° C. for 5 minutes, decreased in temperature to 25° C. at a rate of 320° C. per minute, maintained at 25° C. for 50 minutes, and then increased in temperature from 25° C. to 220° C. at a rate of 10° C. per minute. The melting point (Tm) is determined as the peak top of the endothermic peak observed on the highest temperature side in the melt endothermic curve detected through the temperature rising process.

The reactive polyolefin preferably further satisfies the following conditions.

$$(rrrr)/(1-(mmmm)) \leq 0.1$$

The satisfaction of the aforementioned condition suppresses tackiness.

$$(mm) \times (rr)/(mr)^2 \leq 2.0$$

In the case where the value of $(mm) \times (rr)/(mr)^2$ is 2.0 or less, the transparency is suppressed from being decreased, and good balance is obtained between the flexibility and the elastic recovery rate. The value of $(mm) \times (rr)/(mr)^2$ is preferably in a range of from 1.8 to 0.5, and more preferably from 1.5 to 0.5.

$$20 \leq \text{amount of components eluted at 25° C. or less in temprature rising chromatography} (W25) \leq 100(\% \text{ by mass})$$

The amount of components eluted at 25° C. or less in temperature rising chromatography (W25) of the reactive polyolefin is preferably from 30 to 100% by mass, and more preferably from 50 to 100% by mass.

The value W25 is an index showing as to whether or not the reactive polyolefin is soft, and in the case where the value is small, the amount of a component having a high elastic modulus is increased, and the heterogeneity in meso pentad fraction (mmmm) is increased.

In the case where the reactive polyolefin has W25 of 20% by mass or more, the flexibility thereof is maintained.

The value W25 is an amount (% by mass) of components that is not adsorbed by the filler but is eluted in TREF (temperature rising elution fractionation) at a column temperature of 25° C. in the elution curve obtained by measuring temperature rising chromatography with the apparatus constitution and measurement conditions below.

(1) Operation Method

A solution of the specimen controlled in temperature to 135° C. is introduced into a TREF column, and gradually decreased in temperature to 0° C. at a temperature decreasing rate of 5° C. per hour, followed by maintaining for 30 minutes, thereby crystallizing the specimen on the surface of the filler.

Thereafter, the column is increased in temperature to 135° C. at a temperature rising rate of 40° C. per hour to provide a elution curve.

(2) Apparatus Constitution

TREF column: silica gel column (4.6 in diameter×150 mm), produced by GL Science, Inc.

Flow cell: KBr cell, light path length: 1 mm, produced by GL Science, Inc.

Liquid feed pump: SSC-3100 pump, produced by Senshu Scientific Co., Ltd.

Valve oven: Model 554 oven (high temperature type), produced by GL Science, Inc.

TREF oven: product of GL Science, Inc.

Dual system temperature controller: REX-C100 temperature controller, produced by Rigaku Corporation Detector: infrared detector for liquid chromatography, MIRAN 1A CVF, produced by Foxboro Ten-way valve: electric valve, produced by Barco Loop: 500 µL loop, produced by Barco (3) Measurement Conditions Solvent: o-dichlorobenzene Concentration of specimen: 7.5 g/L Injection amount: 500 µL Pump flow rate: 2.0 mL/min Detected wave number: 3.41 µm Column filler: Chromosolve P (30-60 mesh)

Column temperature distribution: ≧±0.2° C.

The graft copolymer I and the graft copolymer II have a graft ratio of from 1 to 150% by mass, preferably from 2 to 130% by mass, and more preferably from 5 to 100% by mass. In the case where the graft ratio is less than 1% by mass, the curing capability is poor, and the adhesion strength and the heat resistance are not exhibited after curing. In the case where the graft ratio exceeds 150%, the contribution of the polyolefin chain is decreased, and the adhesion strength to a polyolefin base material is not exhibited.

The graft ratio can be measured in the following manner.

The monomer that does not participate in the graft copolymerization reaction and the soluble polymer component are removed by dissolving with a solvent, and the graft ratio is calculated from the mass (W2) of the insoluble graft copolymer component and the mass (W1) of the reactive polyolefin used as a raw material in the following manner.

Graft ratio(% by mass)=$(W2-W1)/W1 \times 100$

As an alternative method, the graft ratio can be determined by NMR measurement of the insoluble graft copolymer component according to an ordinary method.

The graft copolymer I and the graft copolymer II have a weight average molecular weight of from 500 to 400,000, preferably from 1,000 to 350,000, more preferably from 2,000 to 300,000, and further preferably from 5,000 to 250,000. In the case where the weight average molecular weight is less than 500, a sufficient adhesion strength may not be obtained in some cases. In the case where it exceeds 400,000, the flowability is decreased, thereby deteriorating the application property and the coating property.

The graft copolymer I and the graft copolymer II have a molecular weight distribution (Mw/Mn) of from 1.5 to 4, preferably from 1.55 to 3, and more preferably from 1.6 to 2.5. In the case where the molecular weight distribution exceeds 4, a sticky component may be formed in some cases.

Upon obtaining the weight average molecular weight and the molecular weight distribution, the following gel permeation chromatography (GPC) method may be employed.

The molecular weight distribution (Mw/Mn) is a value obtained by measuring the weight average molecular weight (Mw) and the number average molecular weight (Mn) with the following apparatus under the following conditions.

GPC Measurement Apparatus
  Detector: Waters 150C, RI detector for liquid chromatography
  Column: TOSO GMHHR-H(S)HT
Measurement Conditions
  Solvent: 1,2,4-trichlorobenzene
  Measurement temperature: 145° C.
  Flow rate: 1.0 mL/min
  Concentration of specimen: 2.2 mg/mL
  Injection amount: 160 μL
  Calibration curve: universal calibration
  Analysis program: HT-GPC (ver. 1.0)

The weight average molecular weight (Mw) and the number average molecular weight (Mn) are obtained with the constants K and α of the Mark-Houwink-Sakurada equation by the universal calibration method for converting the polystyrene conversion molecular weight to the molecular weight of the corresponding polymer.

Specifically, the molecular weights are determined by the method disclosed in Sadao. Mori, "Size Haijo Chromatography" (Size Exclusion Chromatography), pp. 67-69, Kyoritsu Shuppan Co., Ltd. (1992).

The constants K and α are disclosed in "Polymer Handbook", John Wiley & Sons, Inc.

The molecular weights may also be determined from the newly calculated relationship of the limiting viscosity to the absolute molecular weight according to an ordinary method.

The graft copolymer I and the graft copolymer II preferably have a limiting viscosity (η) measured in decalin at 135° C. of from 0.01 to 2.5 dL/g, more preferably from 0.02 to 2.2 dL/g, and further preferably from 0.05 to 2.0 dL/g.

The graft copolymer I and the graft copolymer II preferably contain no gel component. The amount of the gel component can be reduced by using such a reactive polyolefin that has a large end unsaturated group amount and contains substantially no molecule having an unsaturated group on both ends thereof, and by performing the graft polymerization reaction efficiently.

Measurement Method of Gel Component

A solvent that dissolves both the main chain component and the side chain component of the graft copolymer is used, and 50 mg of the graft copolymer is placed in a cage formed of a stainless steel mesh (400 mesh, mesh size of 0.034 mm) of a glass separable flask equipped with a stirring device, and fixed to the stirring blade.

The solvent containing 0.1% by mass of an antioxidant (BHT) is placed therein, and the copolymer is dissolved therein by stirring at the boiling point for 4 hours.

After dissolving, the recovered cage is sufficiently dried in vacuum, and the insoluble matter was weighed.

The gel component defined as the insoluble matter is calculated by the following expression.

(amount remaining in cage(g)/charged amount(g))× 100 (unit:%)

Examples of the solvent include p-xylene and toluene.

In the aforementioned expression, an amount in a range of from 0 to 1.5% by mass is designated as the case where no gel component is contained.

The reactive polyolefin used in the present invention is preferably one that is produced with a metallocene catalyst, and is preferably one that is produced with a polymerization catalyst containing at least one component selected from (A) a transition metal compound represented by the general formula (I),

(B) (B-1) a compound capable of forming an ionic complex through reaction with the transition metal compound as the component (A) or a derivative thereof, and (B-2) aluminoxane.

In the general formula (I), M represents a metal element of Groups 3 to 10 in Periodic Table or lanthanoid series, and specific examples thereof include titanium, zirconium, hafnium, yttrium, vanadium, chromium, manganese, nickel, cobalt, palladium and a lanthanoid series metal, in which titanium, zirconium and hafnium are preferred from the standpoint of the olefin copolymerization activity and the like, and zirconium is most preferred from the standpoint of the yield of the end vinylidene group and the catalyst activity.

$E^1$ and $E^2$ each represent a ligand selected from a substituted cyclopentadienyl group, an indenyl group, a substituted indenyl group, a heterocyclopentadienyl group, a substituted heterocyclopentadienyl group, an amide group (—N<), a phosphide group (—P<), a hydrocarbon group (>CR—, >C<) and a silicon-containing group (>SiR—, >Si<) (wherein R represents hydrogen, a hydrocarbon group having from 1 to 20 carbon atoms or a hetero atom-containing group), and forms a crosslinked structure through $A^1$ and $A^2$.

$E^1$ and $E^2$ may be the same as or different from each other.

Preferred examples of $E^1$ and $E^2$ include a substituted cyclopentadienyl group, an indenyl group and a substituted indenyl group.

X represents a σ bonding ligand, provided that when there are plural groups of X, plural groups of X may be the same as or different from each other, and each may be crosslinked with the other group of X, $E^1$, $E^2$ or Y.

Specific examples of the group of X include a halogen atom, a hydrocarbon group having from 1 to 20 carbon atoms, an alkoxy group having from 1 to 20 carbon atoms, an aryloxy group having from 6 to 20 carbon atoms, an amide group having from 1 to 20 carbon atoms, a silicon-containing group having from 1 to 20 carbon atoms, a phosphide group having from 1 to 20 carbon atoms, a sulfide group having from 1 to 20 carbon atoms and an acyl group having from 1 to 20 carbon atoms.

Y represents a Lewis base, provided that when there are plural groups of Y, plural groups of Y may be the same as or different from each other, and each may be crosslinked with the other group of Y, $E^1$, $E^2$ or X.

Specific examples of the Lewis base of Y include an amine compound, an ether compound, a phosphine compound and a thioether compound.

$A^1$ and $A^2$ each represents a divalent crosslinking group bonding two ligands, and represents a hydrocarbon group having from 1 to 20 carbon atoms, a halogen-containing hydrocarbon group having from 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$—, wherein $R^1$ represents a hydrogen atom, a halogen atom, a hydrocarbon group having from 1 to 20 carbon atoms or a halogen-containing hydrocarbon group having from 1 to 20 carbon atoms, provided that $A^1$ and $A^2$ may be the same as or different from each other.

Examples of the crosslinking group include a group represented by the general formula (a):

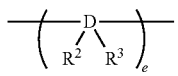

wherein D represents carbon, silicon or tin; $R^2$ and $R^3$ each represent a hydrogen atom or a hydrocarbon group having from 1 to 20 carbon atoms, provided that $R^2$ and $R^3$ may be the same as or different from each other and may be bonded to each other to form a ring structure; and e represents an integer of from 1 to 4.

Examples of the crosslinking group represented by the general formula (a) include a methylene group, an ethylene group, an ethylidene group, a propylidene group, an isopropylidene group, a cyclohexylidene group, a 1,2-cyclohexylene group, a vinylidene group (CH$_2$=C=), a dimethylsilylene group, a diphenylsilylene group, a methylphenylsilylene group, a dimethylgermylene group, a dimethylstanylene group, a tetramethyldisilylene group and a diphenyldisilylene group. Among these, an ethylene group, an isopropylydene group and a dimethylsilylene group are preferred.

q represents an integer of from 1 to 5, which is ((atomic valence of M)−2), and r represents an integer of from 0 to 3.

Among the transition metal compounds represented by the general formula (I), a compound represented by the general formula (II) is preferred.

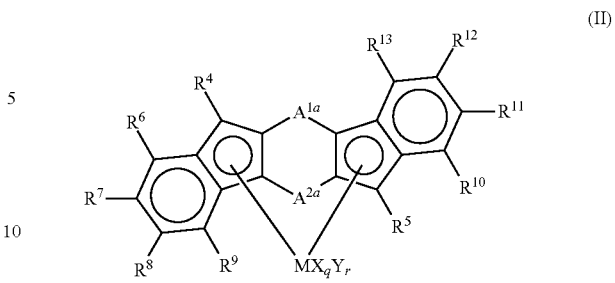

In the general formula (II), M represents a metal element of Groups 3 to 10 in Periodic Table; $A^{1a}$ and $A^{2a}$ each represent a crosslinking group represented by the general formula (a) in the general formula (I), and is preferably CH$_2$, CH$_2$CH$_2$, (CH$_3$)$_2$C, (CH$_3$)$_2$C(CH$_3$)$_2$C, (CH$_3$)$_2$Si and (C$_6$H$_5$)$_2$Si are preferred.

$A^{1a}$ and $A^{2a}$ may be the same as or different from each other.

$R^4$ to $R^{13}$ each represent a hydrogen atom, a halogen atom, a hydrocarbon group having from 1 to 20 carbon atoms, a halogen-containing hydrocarbon group having from 1 to 20 carbon atoms, a silicon-containing group or a hetero atom-containing group.

Examples of the halogen-containing hydrocarbon group having from 1 to 20 carbon atoms include a p-fluorophenyl group, a 3,5-difluorophenyl group, a 3,4,5-trifluorophenyl group, a pentafluorophenyl group, 3,5-bis(tri fluoro) phenyl group and a fluorobutyl group.

Examples of the hetero atom-containing group include a hetero atom-containing group having from 1 to 20 carbon atoms, and specific examples thereof include a nitrogen-containing group, such as a dimethylamino group, a diethylamino group and a diphenylamino group; a sulfur-containing group, such as a phenylsulfide group and a methylsulfide group; a phosphorus-containing group, such as a dimethylphosphino group and a diphenylphosphino group; and an oxygen-containing group, such as a methoxy group, an ethoxy group and a phenoxy group.

Among these, $R^4$ and $R^5$ each are preferably a group containing a hetero atom, such as a halogen, oxygen and silicon, owing to high polymerization activity.

$R^6$ to $R^{13}$ each are preferably a hydrogen atom or a hydrocarbon group having from 1 to 20 carbon atoms.

X and Y have the same meanings as in the general formula (I). q represents an integer of from 1 to 5, which is ((atomic valence of M)−2), and r represents an integer of from 0 to 3.

In the double crosslinked transition metal compound represented by the general formula (II), when both the indenyl groups are the same as each other, examples of the compound of a transition metal of Group 4 in Periodic Table include (1,2'-dimethylsilylene) (2,1'-dimethylsilylene) bis(indenyl) zirconium dichloride, (1,2'-dimethylsilylene) (2,1'-dimethylsilylene) bis(3-methylindenyl)zirconium dichloride, (1,2'-dimethylsilylene) (2,1'-dimethylsilylene) bis(3-ethylindenyl)zirconium dichloride, (1,2'-dimethylsilylene) (2,1'-dimethylsilylene) bis(3-isopropylindenyl)zirconium dichloride, (1,2'-dimethylsilylene) (2,1'-dimethylsilylene) bis(3-trimethylsilylmethylindenyl)zirconium dichloride, (1,2'-dimethylsilylene) (2,1'-dimethylsilylene) bis(3-butylindenyl)zirconium dichloride, (1,2'-dimethylsilylene) (2,1'-dimethylsilylene) bis(4-methylindenyl)zirconium dichloride, (1,2'-dimethylsilylene) (2,1'-dimethylsilylene) bis(4,7-dimethylindenyl)zirconium dichloride, (1,2'-dimethylsilylene) (2,1'-dimethylsilylene) bis(5,6- dimethylindenyl)zirconium dichloride, (1,2'-dimethylsilylene) (2,1'-dimethylsilylene) bis(3-ethoxymethylindenyl)zirconium dichloride, (1,2'-dimethylsilylene) (2,1'-dimethylsilylene) bis(3-ethoxyethylindenyl)zirconium dichloride, (1,2'-dimethylsilylene) (2,1'-dimethylsilylene) bis(3-methoxymethylindenyl)zirconium dichloride, (1,2'-dimethylsilylene) (2,1'-dimethylsilylene) bis(3-methoxyethylindenyl)zirconium dichloride, (1,2'-phenylmethylsilylene) (2,1'-phenylmethylsilylene) bis(indenyl)zirconium dichloride, (1,2'-phenylmethylsilylene) (2,1'-phenylmethylsilylene) bis(3-methylindenyl)zirconium dichloride, (1,2'-dimethylsilylene) (2,1'-isopropylidene) bis(indenyl)zirconium dichloride, (1,2'-dimethylsilylene) (2,1'-isopropylidene) bis(3-methylindenyl)zirconium dichloride, (1,2'-dimethylsilylene) (2,1'-isopropylidene) bis(3-isopropylindenyl)zirconium dichloride, (1,2'-dimethylsilylene) (2,1'-isopropylidene) bis(3-n-butylindenyl)zirconium dichloride, (1,2'-dimethylsilylene) (2,1'-isopropylidene) bis(3-trimethylsilylmethylindenyl)zirconium dichloride, (1,2'-dimethylsilylene) (2,1'-isopropylidene) bis(3-trimethylsilylindenyl)zirconium dichloride, (1,2'-dimethylsilylene) (2,1'-isopropylidene) bis(3-phenylindenyl)zirconium dichloride, (1,2'-dimethylsilylene) (2,1'-methylene) bis(indenyl)zirconium dichloride, (1,2'-dimethylsilylene) (2,1'-methylene) bis(3-methylindenyl)zirconium dichloride, (1,2'-dimethylsilylene) (2,1'-methylene) bis(3-isopropylindenyl)zirconium dichloride, (1,2'-dimethylsilylene) (2,1'-methylene) bis(3-n-butylindenyl)zirconium dichloride, (1,2'-dimethylsilylene) (2,1'-methylene) bis(3-trimethylsilylmethylindenyl)zirconium dichloride, (1,2'-dimethylsilylene) (2,1'-methylene) bis(3-trimethylsilylindenyl)zirconium dichloride, (1,2'-diphenylsilylene) (2,1'-methylene) bis(indenyl)zirconium dichloride, (1,2'-diphenylsilylene) (2,1'-methylene) bis(3-methylindenyl)zirconium dichloride, (1,2'-diphenylsilylene) (2,1'-methylene) bis(3-n-butylindenyl)zirconium dichloride, (1,2'-diphenylsilylene) (2,1'-methylene) bis(3-trimethylsilylmethylindenyl)zirconium dichloride, (1,2'-diphenylsilylene) (2,1'-methylene) bis(3-trimethylsilylindenyl)zirconium chloride, and compounds obtained by replacing zirconium of these compound with titanium or hafnium, but the present invention is not limited to these compounds.

Examples of the compound also include analogous compounds containing a metal element of the other Groups than Group 4.

Preferred examples of the compound include compounds of a transition metal of Group 4, and among these, zirconium compounds are preferred.

In the double crosslinked transition metal compound represented by the general formula (II), when $R^5$ is a hydrogen atom and $R^4$ is not a hydrogen atom, examples of the compound of a transition metal of Group 4 in Periodic Table include (1,2'-dimethylsilylene) (2,1'-dimethylsilylene) (indenyl) (3-trimethylsilylmethylindenyl)zirconium dichloride, (1,2'-dimethylsilylene) (2,1'-dimethylsilylene) (indenyl) (3-methylindenyl)zirconium dichloride, (1,2'-dimethylsilylene) (2,1'-dimethylsilylene) (indenyl) (3-trimethylsilylindenyl)zirconium dichloride, (1,2'-dimethylsilylene) (2,1'-dimethylsilylene) (indenyl) (3-phenylindenyl)zirconium dichloride, (1,2'-dimethylsilylene) (2,1'-dimethylsilylene) (indenyl) (3-benzylindenyl)zirconium dichloride, (1,2'-dimethylsilylene) (2,1'-dimethylsilylene) (indenyl) (3-neopentylindenyl)zirconium dichloride, (1,2'-dimethylsilylene) (2,1'-dimethylsilylene) (indenyl) (3-phenethylindenyl)zirconium dichloride, (1,2'-ethylene) (2,1'-ethylene) (indenyl) (3-methylindenyl)zirconium dichloride, (1,2'-ethylene) (2,1'-ethylene) (indenyl) (3-trimethylsilylmethylindenyl)zirconium dichloride, (1,2'-ethylene) (2,1'-ethylene) (indenyl) (3-trimethylsilylindenyl)zirconium dichloride, (1,2'-ethylene) (2,1'-ethylene) (indenyl) (3-phenylindenyl)zirconium dichloride, (1,2'-ethylene) (2,1'-ethylene) (indenyl) (3-benzylindenyl)zirconium dichloride, (1,2'-ethylene) (2,1'-ethylene) (indenyl) (3-neopentylindenyl)zirconium dichloride, (1,2'-ethylene) (2,1'-ethylene) (indenyl) (3-phenethylindenyl)zirconium dichloride, and compounds obtained by replacing zirconium of these compound with titanium or hafnium, but the present invention is not limited to these compounds.

Examples of the compound also include analogous compounds containing a metal element of the other Groups than Group 4.

Preferred examples of the compound include compounds of a transition metal of Group 4, and among these, zirconium compounds are preferred.

The component (B-1) in the component (B) may be any compound that is capable of forming an ionic complex through reaction with the transition metal compound as the component (A), and preferred examples thereof include compounds represented by the following general formulae (III) and (IV):

$$((L^1-R^{14})^{k+})_a((Z)^-)_b \qquad (III)$$

$$((L^2)^{k+})_a((Z)^-)_b \qquad (IV)$$

wherein $L^2$ is $M^2$, $R^{15}R^{16}M^3$, $R^{17}{}_3C$ or $R^{18}M^3$.

In the formulae (III) and (IV), $L^1$ represents a Lewis base; $(Z)^-$ represents a non-coordinating anion $(Z^1)^-$ or $(Z^2)^-$, wherein $(Z^1)^-$ is an anion containing plural groups bonded to an element, i.e., $(M^1G^1G^2 \ldots G^f)^-$, wherein $M^1$ represents an element of Groups 5 to 15 in Periodic Table, and preferably an element of Groups 13 to 15 in Periodic Table, $G^1$ to $G^f$ each represent a hydrogen atom, a halogen atom, an alkyl group having from 1 to 20 carbon atoms, a dialkylamino group having from 2 to 40 carbon atoms, an alkoxy group having from 1 to 20 carbon atoms, an aryl group having from 6 to 20 carbon atoms, an aryloxy group having from 6 to 20 carbon atoms, an alkylaryl group having from 7 to 40 carbon atoms, an arylalkyl group having from 7 to 40 carbon atoms, a halogen-substituted hydrocarbon group having from 1 to 20 carbon atoms, an acyloxy group having from 1 to 20 carbon atoms, an organic metalloid group or a hetero atom-containing hydrocarbon group having from 2 to 20 carbon atoms, provided that two or more of $G^1$ to $G^f$ may form a ring, and f represents an integer of ((atomic valence of center metal $M^1$)+1), and $(Z^2)^-$ is a conjugated base of a Bronsted acid having a logarithm of inverse of acid dissociation constant (pKa) of −10 or less solely or a combination of the Bronsted acid and a Lewis base, or a conjugated base of an acid that is generally defined as a super acid, provided that the Lewis base may be coordinated; $R^{14}$ represents a hydrogen atom, an alkyl group having from 1 to 20 carbon atoms, an aryl group having from 6 to 20 carbon atoms, an alkylaryl group having from 6 to 20 carbon atoms or an arylalkyl group having from 6 to 20 carbon atoms; $R^{15}$ and $R^{16}$ each represent a cyclopentadienyl group, a substituted cyclopentadienyl group, an indenyl group or a fluorenyl group; $R^{17}$ represents an alkyl group having from 1 to 20 carbon atoms, an aryl group having from 1 to 20 carbon atoms, an alkylaryl group having from 1 to 20 carbon atoms or an arylalkyl group having from 1 to 20 carbon atoms; $R^{18}$ represents a macrocyclic ligand, such as tetraphenyl porphyrin and phthalocyanine; k represents an ionic valence of $(L^1-R^{14})$ or $(L^2)$, which is an integer of from 1 to 3; a represents an integer of 1 or more; b represents (k×a);

$M^2$ includes an element of Groups 1 to 3, 11 to 13, and 17 in Periodic Table; and $M^3$ represents an element of Groups 7 to 12 in Periodic Table.

Specific examples of $L^1$ include ammonia, an amine compound, such as methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N, N-dimethylaniline and p-nitro-N, N-dimethylaniline, a phosphine compound, such as triethylphosphine, triphenylphosphine and diphenylphosphine, a thioether compound, such as tetrahydrothiophene, an ester compound, such as ethyl benzoate, and a nitrile compound, such as acetonitrile and benzonitrile.

Specific examples of $R^{14}$ include hydrogen, a methyl group, an ethyl group, a benzyl group and a trityl group, and specific examples of $R^{15}$ and $R^{16}$ include a cyclopentadienyl group, a methylcyclopentadienyl group, an ethylcyclopentadienyl group and a pentamethylcyclopentadienyl group.

Specific examples of $R^{17}$ include a phenyl group, a p-tolyl group and a p-methoxyphenyl group, and specific examples of $R^{18}$ include tetraphenyl porphyrin and phthalocyanine.

Specific examples of $M^2$ include Li, Na, K, Ag, Cu, Br, I and $I_3$, and specific examples of $M^3$ include Mn, Fe, Co, Ni and Zn.

In $(Z^1)^-$, i.e., $(M^1G^1G^2 \ldots G^f)^-$, specific examples of $M^1$ include B, Al, Si, P, As and Sb, and preferably B and Al. Specific examples of $G^1$ and $G^2$ to $G^f$ include a dialkylamino group, such as a dimethylamino group and a diethylamino group, an alkoxy group or an aryloxy group, such as a methoxy group, an ethoxy group, a n-butoxy group and a phenoxy group, a hydrocarbon group, such as a methyl group, an ethyl group, a n-propyl group, an isopropyl group, a n-butyl group, an isobutyl group, a n-octyl group, a n-eicosyl group, a phenyl group, a p-tolyl group, a benzyl group, a 4-t-butylphenyl group and a 3,5-dimethylphenyl group, a halogen atom, such as fluorine, chlorine, bromine and iodine, a hetero atom-containing hydrocarbon group, such as a p-fluorophenyl group, a 3,5-difluorophenyl group, a pentachlorophenyl group, a 3,4,5-trifluorophenyl group, a pentafluorophenyl group, a 3,5-bis(trifluoromethyl)phenyl group and a bis(trimethylsilyl)methyl group, and an organic metalloid group, such as a pentamethylantimony group, a trimethylsilyl group, a trimethylgermyl group, a diphenylarsine group, a dicyclohexylantimony group and a diphenylboron group.

Specific examples of the non-coordinating anion, i.e., the conjugated base of a Bronsted acid having pKa of −10 or less solely or a combination of the Bronsted acid and a Lewis base $(Z^2)^-$ include trifluoromethanesulfonic acid anion $(CF_3SO_3)^-$, bis(trifluoromethanesulfonyl)methyl anion, bis(trifluoromethanesulfonyl)benzyl anion, bis(trifluoromethanesulfonyl)amide, perchloric acid anion $(ClO_4)^-$, trifluoroacetic acid anion $(CF_3CO_2)^-$, hexafluoroantimony anion $(SbF_6)^-$, fluorosulfonic acid anion $(FSO_3)^-$, chlorosulfonic acid anion $(ClSO_3)^-$, fluorosulfonic acid anion/pentafluoroantimony $(FSO_3/SbF_5)^-$, fluorosulfonic acid anion/pentafluoroarsenic $(FSO_3/AsF_5)^-$ and trifluoromethanesulfonic acid/pentafluoroantimony $(CF_3SO_3/SbF_5)^-$.

Specific examples of the ionic compound capable of forming an ionic complex through reaction with the transition metal compound as the component (A), i.e., the compound as the component (B-1), include triethylammonium tetraphenyl borate, tri-n-butylammonium tetraphenyl borate, trimethylammonium tetraphenyl borate, tetraethylammonium tetraphenyl borate, methyl(tri-n-butyl)ammonium tetraphenyl borate, benzyl(tri-n-butyl)ammonium tetraphenyl borate, dimethyldiphenylammonium tetraphenyl borate, triphenyl(methyl)ammonium tetraphenyl borate, trimethylanilinium tetraphenyl borate, methylpyridinium tetraphenyl borate, benzylpyridinium tetraphenyl borate, methyl(2-cyanopyridinium)tetraphenyl borate, triethylammonium tetrakis(pentafluorophenyl)borate, tri-n-butylammonium tetrakis(pentafluorophenyl)borate, triphenylammonium tetrakis(pentafluorophenyl)borate, tetra-n-butylammonium tetrakis(pentafluorophenyl)borate, tetraethylammonium tetrakis(pentafluorophenyl)borate, benzyl(tri-n-butyl)ammonium tetrakis(pentafluorophenyl)borate, methyldiphenylammonium tetrakis(pentafluorophenyl)borate, triphenyl(methyl)ammonium tetrakis(pentafluorophenyl)borate, methylanilinium tetrakis(pentafluorophenyl)borate, dimethylanilinium tetrakis(pentafluorophenyl)borate, triphenylcarbenium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium)tetrakis(pentafluorophenyl)borate, benzyl(2-cyanopyridinium)tetrakis(pentafluorophenyl)borate, methyl(4-cyanopyridinium)tetrakis(pentafluorophenyl)borate, triphenylphosphonium tetrakis(pentafluorophenyl)borate, dimethylanilinium tetrakis(bis(3,5-ditrifluoromethyl)phenyl)borate, ferrocenium tetraphenyl borate, silver tetraphenyl borate, trityl tetraphenyl borate, tetraphenylporphyrin manganese tetraphenyl borate, ferrocenium tetrakis(pentafluorophenyl)borate, (1,1'-dimethylferrocenium)tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis(pentafluorophenyl)borate, tetraphenylporphyrin manganese tetrakis (pentafluorophenyl)borate, silver tetrafluoroborate, silver hexafluorophosphate, silver hexafluoroarsenate, silver perchlorate, silver trifluoroacetate and silver trifluoromethanesulfonate.

The compound (B-1) may be used solely or in combination of two or more kinds thereof.

Examples of the aluminoxane as the component (B-2) include a chain aluminoxane represented by the general formula (V):

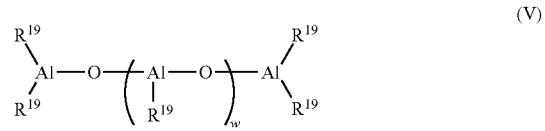

wherein $R^{19}$ represents a hydrocarbon group having from 1 to 20, preferably from 1 to 12 carbon atoms, such as an alkyl group, an alkenyl group, an aryl group and an arylalkyl group, or a halogen atom; and w represents an average polymerization degree, which is an integer of generally from 2 to 50, and preferably from 2 to 40. Plural groups of $R^{19}$ may be the same as or different from each other, and a cyclic aluminoxane represented by the general formula (VI):

wherein $R^{19}$ and w have the same meanings as in the general formula (V).

Examples of the method for producing the aluminoxane include a method of making an alkylaluminum in contact with a condensing agent, such as water, but the method is not particularly limited, and the compounds may be subjected to reaction according to any known method.

Examples of the production method include the following methods: (a) an organoaluminum compound is dissolved in an organic solvent and then is made into contact with water, (b) an organoaluminum compound is added in the initial stage of polymerization, and water is then added later, (c) crystal water contained in a metal salt or the like or adsorbed water to an inorganic material or an organic material is reacted with an organoaluminum compound, and (d) a tetraalkyldialuminoxane is reacted with a trialkylaluminm and then reacted with water.

The aluminoxane may be insoluble in toluene.

The aluminoxane may be used solely or in combination of two or more kinds thereof.

The ratio of the catalyst component (A) and the catalyst component (B) used is, in the case where the compound (B-1) is used as the catalyst component (B), preferably from 10/1 to 1/100, and more preferably from 2/1 to 1/10, in terms of molar ratio, and when the ratio is in the range, the cost of the catalyst per unit mass of the polymer is not too high, which is practically favorable. In the case where the compound (B-2) is used, the ratio is preferably from 1/1 to 1/1,000,000, and more preferably from 1/10 to 1/10,000, in terms of molar ratio. When the ratio is in the range, the cost of the catalyst per unit mass of the polymer is not too high, which is practically favorable. As the catalyst component (B), the compound (B-1) or (B-2) may be used solely or in combination of two or more kinds thereof.

As the polymerization catalyst for producing the reactive polyolefin in the present invention, (C) an organoaluminum compound may be used in addition to the component (A) and the component (B) described above.

Examples of the organoaluminum compound used as the component (C) include a compound represented by the general formula (VII):

$$R^{20}{}_{v}AlJ_{3-v} \quad (VII)$$

wherein $R^{20}$ represents an alkyl group having from 1 to 10 carbon atoms; J represents a hydrogen atom, an alkoxy group having from 1 to 20 carbon atoms, an aryl group having from 6 to 20 carbon atoms or a halogen atom; and v represents an integer of from 1 to 3.

Specific examples of the compound represented by the general formula (VII) include trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride and ethylaluminum sesquichloride. The organoaluminum compounds may be used solely or in combination of two or more kinds thereof.

The ratio of the catalyst component (A) and the catalyst component (C) used is preferably from 1/1 to 1/10,000, more preferably from 1/5 to 1/2,000, and further preferably from 1/10 to 1/1,000, in terms of molar ratio.

The use of the catalyst component (C) enhances the polymerization activity per the transition metal, but when the amount thereof is too large, the organoaluminum compound is wasted, and unfavorably remains in the polymer in a large amount. In the production of the reactive polyolefin in the present invention, at least one kind of the catalyst components may be used after being supported on an appropriate carrier.

The kind of the carrier is not particularly limited. An inorganic oxide carrier and other inorganic and organic carriers may be used, and in particular, an inorganic oxide carrier and other inorganic carriers are preferred.

In the production of the reactive polyolefin in the present invention, the polymerization method is not particularly limited, and any of a slurry polymerization method, a gas phase polymerization method, a block polymerization method, a solution polymerization method and a suspension polymerization method, with a slurry polymerization method and a gas phase polymerization method being particularly preferred.

With respect to the polymerization conditions, the polymerization temperature is generally from −100 to 250° C., preferably from −50 to 200° C., and more preferably from 0 to 130° C., the polymerization time is generally from 5 minutes to 10 hours, and the reaction pressure is preferably from ordinary pressure to 20 MPa (gauge), and further preferably from ordinary pressure to 10 MPa (gauge).

In the case where a polymerization solvent is used, examples thereof include an aromatic hydrocarbon, such as benzene, toluene, xylene and ethylbenzene, an alicyclic hydrocarbon, such as cyclopentane, cyclohexane and methylcyclohexane, and a halogenated hydrocarbon, such as chloroform and dichloromethane. The solvent may be used solely or in combination of two or more kinds thereof. A monomer, such as an α-olefin, may be used as a solvent. Some of the polymerization methods may be performed without solvent.

The reactive polyolefin used in the present invention is preferably obtained by performing polymerization reaction in the presence of the aforementioned polymerization catalyst at a molar ratio of hydrogen and the transition metal compound (hydrogen/transition metal compound) in a range of from 0 to 10,000. In the case where the ratio hydrogen/transition metal is 0, the component (B) used is preferably methylanilinium tetrakis(perfluorophenyl) borate, dimethylanilinium tetrakis (pentafluorophenyl) borate and triphenylcarbenium tetrakis (pentafluorophenyl) borate.

In general, it is known that hydrogen functions as a molecular weight controlling agent or a chain transfer agent, and the end of the polymer chain has a saturated structure. That is, hydrogen functions as a molecular weight controlling agent or a chain transfer agent, whereby the molecular weight is decreases monotonously in proportion to the addition amount thereof, and simultaneously the unsaturation degree of the polymer end is extremely decreased. It is also known that hydrogen also has a function of re-activating the dormant species to enhance the catalyst activity. Upon using hydrogen for these purposes, in general, the molar ratio of hydrogen and the transition metal compound is from 13,000 to 100,000.

In the present invention, the effect of a slight amount of hydrogen (a molar ratio of hydrogen/transition metal compound of 10,000 or less) on the catalyst capability is unclear, but the use of hydrogen in the aforementioned particular range enhances the selectivity of the end vinylidene group and the activity. Accordingly, the present invention has been completed based on the following findings:

(1) the range of slight amount of hydrogen added, in which the molecular weight is not changed even though hydrogen is added, (2) the range of slight amount of hydrogen added, in which the catalyst activity is enhanced, and the amount of the catalyst remaining in the polymer is decreased to provide a high purity product, and (3) the range of slight amount of hydrogen added, in which the vinylidene group purity in the end unsaturated group is enhanced.

The molar ratio of hydrogen and the transition metal compound (hydrogen/transition metal compound) is preferably from 10 to 9,000, more preferably from 20 to 8,000, further preferably from 40 to 7,000, still further preferably from 200 to 4,500, still further preferably from 300 to 4,000, and most preferably from 400 to 3,000. In the case where the molar ratio is less than 10,000, a polyolefin polymer that is extremely low in end unsaturation degree is suppressed from being formed, thereby providing the target reactive polyolefin with high purity end unsaturated group. As compared to the case where the molar ratio is 0, the presence of a slight amount of hydrogen increases the content of the end vinylidene group. Examples of the end unsaturated group other than the end vinyl idene group include an end vinyl group, and a polymer containing an end vinyl group tends to involve such problems that the reactivity upon graft copolymerization is decreased. In this case, the presence of a slight amount of hydrogen is preferred since it increases the number of the end vinylidene group and decreases the amount of the end vinyl group formed.

The end vinyl group can be quantitatively determined by utilizing $^1$H-NMR and $^{13}$C-NMR, and the details thereof have been described for the end vinylidene group.

Specifically, the ratio (%) of the end vinyl group occupied in the unsaturated groups can be calculated as follows.

$(D)/((C)+(D))\times 100$ unit:%

The ratio of the end vinyl group occupied in the unsaturated groups is preferably 15% or less, more preferably 10% or less, further preferably 8% or less, and most preferably from 0 to 5%.

As shown in the examples, the polymerization reaction is performed with a controlled hydrogen amount, whereby decrease of the molecular weight is not observed even though hydrogen is added, and significant enhancement of the activity and enhancement of the selectivity of the end vinylidene group are exhibited.

In the polymerization, preliminary polymerization may be performed by using the polymerization catalyst.

The preliminary polymerization may be performed, for example, by making a small amount of an olefin into contact with the solid catalyst component, but the method therefor is not particularly limited, and any known method may be employed.

The olefin used in the preliminary polymerization is not particularly limited, and examples thereof include those having been exemplified above, for example, an olefin having from 3 to 20 carbon atoms, and mixtures thereof. It is advantageous to use the same olefin as the olefin that is to be used in the subsequent polymerization.

The preliminary polymerization temperature is generally from −20 to 200° C., preferably from −10 to 130° C., and more preferably from 0 to 80° C. In the preliminary polymerization, a solvent, such as an aliphatic hydrocarbon, an aromatic hydrocarbon and a monomer, may be used. Among these, an aliphatic hydrocarbon is particularly preferred. The preliminary polymerization may be performed without solvent.

In the preliminary polymerization, the conditions therefor are preferably controlled in such a manner that the preliminary polymerization product has a limiting viscosity (η) measured in decalin at 135° C. of 0.1 dL/g or more, and the amount of the preliminary polymerization product is from 1 to 10,000 g, particularly from 10 to 1,000 g per 1 mmol of the transition metal component in the catalyst.

Examples of the method of controlling the molecular weight of the polymer include selection of the kind and the amount of the catalyst component used, selection of the polymerization temperature, and copolymerization in the presence of hydrogen. An inert gas, such as nitrogen, may be present.

As described above, the use of the particular catalyst controls the crystallinity (stereoregularity) of the polyolefin, and a polyolefin that has a homogeneous composition and high flowability can be produced.

Production Method of Graft Copolymer

The graft copolymer I and the graft copolymer II are obtained by polymerizing the monomer for the main chain in the presence of the reactive polyolefin. In the polymerization reaction, a known radical initiator is used, which may be selected, for example, from an organic peroxide and an azo compound, both of which are preferred radical initiators.

Examples of the organic peroxide include a diacyl peroxide compound, such as dibenzoyl peroxide, di-8,5,5-trimethylhexanoyl peroxide, dilauroyl peroxide, didecanoyl peroxide and di(2,4-dichlorobenzoyl) peroxide, a hydroperoxide compound, such as t-butyl hydroperoxide, cumene hydroperoxide, diisopropylbenzene hydroperoxide and 2,5-dimethylhexane 2,5-dihydroperoxide, a dialkyl peroxide compound, such as di-t-butyl peroxide, dicumyl peroxide, 2,5-dimethyl-2,5-di(t-butyloxy)hexane, 2,5-dimethyl-2,5-di(t-butylperoxy)hexyne-3 and α,α'-bis(t-butylperoxy)diisopropylbenzene, a peroxyketal compound, such as 1,1-bis-t-butylperoxy-3,3,5-trimethylcyclohexane and 2,2-bis(t-butylperoxy)butane, an alkyl perester compound, such as t-butyl peroxyoctoate, t-butyl peroxypivalate, t-butyl peroxyneodecanoate and t-butyl peroxybenzoate, and a peroxycarbonate compound, such as di-2-ethylhexyl peroxydicarbonate, diisopropyl peroxydicarbonate, di-sec-butyl peroxydicarbonate and t-butyl peroxyisopropylcarbonate, and among these, a dialkyl peroxide compound is preferred.

Examples of the azo compound include azobisisobutyronitrile and azobisisovaleronitrile.

The radical initiator may be used solely or in combination of two or more kinds thereof.

The amount of the radical initiator used in the graft copolymerization reaction is not particularly limited and is appropriately selected depending on the desired properties of the graft copolymer.

The radical initiator may be used in an amount of from 0.001 to 10 parts by mass, and preferably from 0.005 to 5 parts by mass, per 100 parts by mass of the reactive polyolefin.

The amounts of the monomer included in (I) to (V) and the monomer included in the group A and the group B used may be appropriately determined depending on the purpose, and may be selected from a range of from 0.2 to 300 parts by mass per 100 parts by mass of the reactive polyolefin. The amount used is preferably from 1 to 250 parts by mass, more preferably from 5 to 200 parts by mass, and further preferably from 10 to 180 parts by mass. In the case where the amount used is 0.2 part by mass or more, it is preferred since the amount of the monomer that is copolymerized into the graft copolymer is increased, and the functions including compatibility are liable to be exhibited, and in the case where the amount used is 300 parts by mass or less, it is preferred since a polymer that does not participate in the graft copolymerization is not by-produced.

The graft polymerization method is not particularly limited, and for example, the reactive polyolefin, the monomer and the radical initiator are reacted by melt-kneading with a roll mill, a Banbury mixer, an extruder or the like, thereby producing the graft copolymer. As the reaction conditions, the reaction temperature may be from 60 to 140° C., and the reaction time may be from 0.01 to 0.5 hour.

The graft copolymer may be produced in a suitable organic solvent or without solvent. Examples of the organic solvent include a hydrocarbon solvent, such as butane, pentane, hexane, cyclohexane and toluene, a halogenated hydrocarbon solvent, such as chlorobenzene, dichlorobenzene and trichlorobenzene, and liquefied α-olefin. As the reaction conditions, the reaction temperature may be from 40 to 140° C., and preferably from 50 to 140° C., and the reaction time may be from 0.1 to 10 hours.

In the case where the graft copolymerization is performed under a high temperature conditions that is ordinarily employed, such phenomena are liable to occur as decrease of the molecular weight and the viscosity due to decomposition of the reactive polyolefin, and formation of gel due to crosslinking reaction. However, the aforementioned conditions are of a relatively low temperature, in which the molecular weight and the viscosity are not decreased, and side reaction, such as crosslinking reaction, is suppressed from occurring.

The graft copolymerization reaction of the invention may be performed in the presence of a Lewis acid, and examples of the Lewis acid include the following compounds.

(1) a halogenide (such as chloride, bromide, iodide and fluoride), an alkylated product (a hydrocarbon group having from 1 to 20 carbon atoms) and a halogenated and alkylated product of an element of Groups 2 to 4 in Periodic Table (2) Lewis acids containing such an atom as aluminum, boron, zinc, tin, magnesium and calcium Specific examples of the Lewis acid include magnesium chloride, calcium chloride, zinc chloride, boron trichloride, aluminum trichloride, gallium trichloride, silicon tetrachloride, silicon tetrachloride, compounds obtained by replacing the chlorine atom of these compounds with a bromine atom or a fluorine atom, butylethylmagnesium, diethylzinc, trimethylaluminum, triethylaluminum, triisobutylaluminum, tri-n-hexylaluminum, trimethylboron, triethylboron, triethylgallium, trimethylgallium, diethylammonium nonochloride, ethylaluminum dichloride and ethylaluminum sesquichloride, and among these, a zinc compound, an aluminum compound and a boron compound are preferred.

The amount of the Lewis acid used in the graft copolymerization reaction in terms of Lewis acid/monomer (mol/mol) may be from 0.01 to 1, preferably from 0.05 to 1, and more preferably from 0.1 to 0.5. In the case where the ratio Lewis acid/monomer (mol/mol) is 0.01 or more, it is preferred since a high graft rate is obtained, and in the case where the ratio is 1 or less, it is preferred since removal of the Lewis acid by deashing is not necessary, thereby avoiding coloration and the like.

The graft copolymerization may be performed by adding the Lewis acid before the addition of the radical initiator, or in alternative, the graft copolymerization may be performed by using a product that is obtained by making the monomer and the Lewis acid in contact with each other in advance.

Reactive Hot-Melt Adhesive

The reactive hot-melt adhesive of the present invention contains the graft copolymer I or the graft copolymer II, and is excellent in adhesion strength and heat resistance after curing since a bond is formed by utilizing the crosslinkable functional group of the graft copolymer.

The bond utilizing the crosslinkable functional group is not particularly limited as far as a bond is formed through reaction of the crosslinkable functional group. Examples of the crosslinkable functional group of the graft copolymer include a carboxylic acid group, a carboxylic anhydride group, a hydroxyl group, an amino group, an epoxy group, an isocyanate group and an alkoxysilicon group, and an alkoxysilicon group and an isocyanate group are particularly preferred. Preferred examples of the bond utilizing an alkoxysilicon group include a bond between the alkoxysilicon groups, and a bond formed through reaction with a carboxylic acid group or a carboxylic anhydride group, and preferred examples of the bond utilizing an isocyanate group include a bond formed through reaction with an epoxy group or a hydroxyl group.

In the case where an alkoxysilicon group is used as the crosslinkable functional group, a heat treatment is generally performed after making in contact with water or moisture. A silanol condensation catalyst may be used as a curing catalyst on the reaction. Examples of the silanol condensation catalyst include an organic metal catalyst and a tertiary amine compound. Examples of the organic metal compound include dibutyltin dilaurate, dibutyltin diacetate, dibutyltin dioctate, tin octenoate, lead octenoate and lead naphthenoate. Examples of the tertiary amine compound include N-triethylamine, N-methylmorpholine bis(2-dimethylaminoethyl) ether, N,N,N',N'',N''-pentamethyldiethylenetriamine, N,N,N'-trimethylaminoethylethanolamine, bis(2-dimethylaminoethyl)ether, N-methyl-N'-dimethylaminoethylpiperazine and an imidazole compound obtained by replacing the secondary amine functional group on the imidazole ring with a cyanoethyl group. The catalyst may be used solely or in combination of two or more kinds thereof. Among the aforementioned catalysts, dibutyltin dilaurate, dibutyltin diacetate and dibutyltin dioctate are particularly preferred. The amount thereof added is generally from 0.005 to 2.0% by mass, and preferably from 0.01 to 0.5% by mass, based on the graft copolymer.

In the case where an isocyanate group is used as the crosslinkable functional group, a curing catalyst may be used, and usable examples thereof include those exemplified for the silanol condensation catalyst.

The reactive hot-melt adhesive of the present invention may contain a crosslinking agent. The crosslinking agent is a compound that has two or more functional groups capable of reacting with the crosslinkable functional group of the graft copolymer per one molecule. Examples of the functional group capable of reacting with the crosslinkable functional group of the graft copolymer contained in the crosslinking agent include a carboxylic acid group, a carboxylic anhydride group, a hydroxyl group, an amino group, an isocyanate group and an epoxy group.

Examples of the crosslinking agent include a diamine compound, a dialcohol compound, a triamine compound, a polyfunctional alcohol compound, a diisocyanate compound and a bifunctional epoxy compound.

The content of the crosslinking agent is preferably from 0.01 to 10% by mass, and more preferably from 0.01 to 5% by mass, based on the total amount of the adhesive.

The reactive hot-melt adhesive of the present invention may contain oil, a polyolefin resin, a tackifier and an inorganic filler.

Examples of the oil include oil, such as naphthene oil, paraffin oil and aromatic oil, and liquid rubber, such as liquid polybutene and liquid polyisobutylene.

Examples of the polyolefin resin include polyethylene, polypropylene and an ethylene-propylene copolymer.

Examples of the tackifier include rosin and a derivative thereof, a terpene resin and a hydrogenated resin thereof, a styrene resin, a coumarone-indene resin, a dicyclopentadiene (DCPD) resin and a hydrogenated resin thereof, a aliphatic (C5 series) petroleum resin and a hydrogenated resin thereof, an aromatic (C9 series) petroleum resin and a hydrogenated resin thereof, and a C5-C9 series copolymer petroleum resin and a hydrogenated resin thereof.

Examples of the inorganic filler include silica, alumina, zinc oxide, titanium oxide, calcium oxide, magnesium oxide, iron oxide, tin oxide, antimony oxide, a ferrite compound, calcium hydroxide, magnesium hydroxide, aluminum hydroxide, basic magnesium carbonate, calcium carbonate, zinc carbonate, barium carbonate, dawsonite, hydrotalcite, calcium sulfate, barium sulfate, calcium silicate, talc, clay, mica, montmorillonite, bentonite, sepiolite, imogolite, sericite, glass fibers, glass beads, silica balloons, aluminum nitride, boron nitride, silicon nitride, carbon black, graphite, carbon fibers, carbon balloons, zinc borate and magnetic powder. The inorganic filler may be subjected to a surface treatment with a coupling agent, such as silane and titanate coupling agents, and examples of the treating method therefor include a method of treating the inorganic filler directly with a coupling agent by a dry method, a slurry method, a spraying method or the like, an integral blending method, such as a direct method and a master batch method, and a dry concentrating method.

EXAMPLE

The present invention will be described in more detail with reference to examples below, but the present invention is not limited to the examples.

Production Example 1

Production of Reactive Polypropylene (1) Synthesis of Metal Complex (1,2'-dimethylsilylene) (2,1'-dimethylsilylene) bis(3-trimethylsilylmethylindenyl)zirconium dichloride was synthesized in the following manner.

3.0 g (6.97 mmol) of lithium salt of (1,2'-dimethylsilylene) (2,1'-dimethylsilylene) bis(indene) was dissolved in 50 mL of THF (tetrahydrofuran) in a Schlenk flask and cooled to −78° C. 2.1 mL (14.2 mmol) of iodomethyltrimethylsilane was slowly added dropwise thereto, and the mixture was stirred at room temperature for 12 hours.

After removing the solvent, 50 mL of ether was added, and the mixture was rinsed with a saturated ammonium chloride solution. After separating the mixture, the organic phase was dried, and the solvent was removed, thereby providing 3.04 g (5.88 mmol) of (1,2'-dimethylsilylene) (2,1'-dimethylsilylene) bis(3-trimethylsilylmethylindene) (yield: 84%).

3.04 g (5.88 mmol) of (1,2'-dimethylsilylene) (2,1'-dimethylsilylene) bis (3-trimethylsilylmethylindene) obtained above and 50 mL of ether were placed in a Schlenk flask under a nitrogen stream. The mixture was cooled to −78° C., and a hexane solution of n-butyllithium (n-BuLi) (1.54 M, 7.6 mL (11.7 mmol)) was added dropwise thereto. The temperature was increased to room temperature, and the mixture was stirred for 12 hours, followed by removing the ether. The resulting solid matter was rinsed with 40 mL of hexane, thereby providing 3.06 g (5.07 mmol) of an ether adduct of a lithium salt (yield: 73%).

The result of $^1$H-NMR measurement (90 MHz, THF-d$^8$) were as follows.

δ: 0.04 (s, 18H, trimethylsilyl), 0.48 (s, 12H, dimethylsilylene), 1.10 (t, 6H, methyl), 2.59 (s, 4H, methylene), 3.38 (q, 4H, methylene), 6.2-7.7 (m, 8H, Ar—H)

The resulting lithium salt was dissolved in 50 mL of toluene under a nitrogen stream. The solution was cooled to −78° C., and a suspension liquid of 1.2 g (5.1 mmol) of zirconium tetrachloride in toluene (20 mL) having been cooled to −78° C. in advance was added dropwise thereto. After completing the dropwise addition, the mixture was stirred at room temperature for 6 hours. The solvent was removed from the reaction solution. The resulting residue was recrystallized from dichloromethane, thereby providing 0.9 g (1.33 mmol) of (1,2'-dimethylsilylene) (2,1'-dimethylsilylene) bis(3-trimethylsilylmethylindenyl) zirconium dichloride (yield: 26%).

The result of $^1$H-NMR measurement (90 MHz, CDCl$_3$) were as follows.

δ: 0.0 (s, 18H, trimethylsilyl), 1.02, 1.12 (s, 12H, dimethylsilylene), 2.51 (dd, 4H, methylene), 7.1-7.6 (m, 8H, Ar—H)

(2) Polymerization of Propylene 0.4 L of dried heptane, 1 mL of a heptane solution of 0.5 mmol of triisobutylaluminum and 2 mL of a heptane slurry of 1.5 μmol of methylanilinium tetrakis(perfluorophenyl)borate were placed in a stainless steel autoclave with a capacity of 1.4 L having been dried by heating, and the mixture was stirred for 10 minutes at a temperature controlled to 50° C. 1.0 mL of a heptane slurry of 1.0 μmol of (1,2'-dimethylsilylene) (2,1'-dimethylsilylene) bis(3-trimethylsilylmethylindenyl) zirconium dichloride prepared in the item (1) above was further added thereto. The temperature was increased to 75° C. under stirring, to which 100 mL of hydrogen was introduced, and propylene gas was introduced until the total pressure reached 0.6 MPa. Polymerization was performed for 120 minutes while propylene gas was fed with a pressure controller to make the pressure constant during the polymerization. The reaction mixture was then cooled, and unreacted propylene was removed by depressurizing, followed by taking out the contents. The contents were dried in the air, and then further dried at 80° C. under reduced pressure for 8 hours, thereby providing 123 g of polypropylene. The results of evaluation of polymerization are shown in Table 1.

Production Example 2

Production of Reactive Polypropylene (1) Synthesis of Metal Complex (1,2'-dimethylsilylene) (2,1'-dimethylsilylene) (3-trimethylsilylmethylindenyl) (indenyl)zirconium dichloride was synthesized in the following manner.

50 mL of ether and 3.5 g (10.2 mmol) of (1,2'-dimethylsilylene) (2,1'-dimethylsilylene) bis(indene) were placed in a 200-mL Schlenk flask, to which a hexane solution of n-butyllithium (n-BuLi) (1.60 mol/L, 12.8 mL) was added dropwise at −78° C. After stirring the mixture at room temperature for 8 hours, the solvent was distilled off, and the resulting solid matter was dried under reduced pressure, thereby providing 5.0 g of a white solid matter. The solid was dissolved in 50 mL of tetrahydrofuran (THF), to which 1.4 mL of iodomethyltrimethylsilane was added dropwise at room temperature. Hydrolysis was performed with 10 mL of water, and the organic phase was extracted with 50 mL of ether. The organic phase was dried, and the solvent was removed. 50 mL of ether was added thereto, and a hexane solution of n-BuLi (1.60 mol/L, 12.4 mL) was added dropwise thereto at −78° C. After increasing the temperature to room temperature, the mixture was stirred for 3 hours, and the ether was distilled off. The resulting solid matter was rinsed with 30 mL of hexane and then dried under reduced pressure. 5.11 g of the white solid matter was suspended in 50 mL of toluene, and 2.0 g (8.60 mmol) of zirconium tetrachloride having been suspended in 10 mL of toluene in another Schlenk flask in advance was added thereto. After stirring the mixture at room temperature for 12 hours, the solvent was distilled off. The resulting residue was rinsed with 50 mL of hexane, and the residue was recrystallized from 30 mL of dichloromethane, thereby providing 1.2 g of yellow microcrystals (yield: 25%).

(2) Polymerization of Propylene 0.4 L of dried heptane, 1 mL of a heptane solution of 0.5 mmol of triisobutylaluminum and 2 mL of a heptane slurry of 2.0 μmol of methylanilinium tetrakis(perfluorophenyl)borate were placed in a stainless steel autoclave with a capacity of 1.4 L having been dried by heating, and the mixture was stirred for 10 minutes at a temperature controlled to 50° C. 1.0 mL of a heptane slurry of 1.5 μmol of (1,2'-dimethylsilylene) (2,1'-dimethylsilylene) bis(3-trimethylsilylmethylindenyl) (indenyl)zirconium dichloride prepared in the item (1) above as the transition metal compound complex was further added thereto. The temperature was increased to 70° C. under stirring, to which propylene gas was introduced until the total pressure reached 0.6 MPa. Polymerization was performed for 200 minutes while propylene gas was fed with a pressure controller to make the pressure constant during the polymerization. The reaction mixture was then cooled, and unreacted propylene was removed by depressurizing, followed by taking out the contents. The contents were dried in the air, and then further dried at 80° C. under reduced pressure for 8 hours, thereby providing 111 g of polypropylene. The results of evaluation of polymerization are shown in Table 1.

TABLE 1

|  | Production Example | |
|---|---|---|
|  | 1 | 2 |
| Number of end vinylidene group (per molecule) | 0.97 | 0.96 |
| Stereoregularity (mmmm) (%) | 42 | 58 |
| Limiting viscosity η (dL/g) | 0.4 | 0.4 |
| Weight average molecular weight | 42,700 | 41,000 |
| Molecular weight distribution | 1.8 | 1.8 |
| Melting point (° C.) | 68.0 | 95.7 |

Example 1

Production of Graft Copolymer 70 g of the reactive polypropylene synthesized in Production Example 1 and 140 mL of toluene were placed in a 1-L separable flask equipped with a stirring device under a nitrogen atmosphere, and were dissolved by stirring at a temperature of 70° C. 2.2 mL of methacryloxypropyltriethoxysilane and 13 mL of butyl acrylate were added thereto, and it was confirmed that they were completely dissolved. 15 mL of a toluene solution of 0.35 g of α,α'-azobisisobutyronitrile (AIBN) was added dropwise thereto over 2 hours, and graft copolymerization reaction was performed for 420 minutes. After completing the reaction, the total contents were recovered and then dried in the air, and further dried under reduced pressure at 85° C. for 24 hours, thereby providing 78 g of a graft copolymer. The characteristics thereof are shown in Table 2.

Example 2

Production of Graft Copolymer

The same procedures as in Example 1 were performed except that 6.7 mL of acrylic acid was used instead of 13 mL of butyl acrylate, thereby providing 76 g of a graft copolymer. The characteristics thereof are shown in Table 2.

Example 3

Production of Graft Copolymer 100 g of the reactive polypropylene synthesized in Production Example 1 and 200 mL of toluene were placed in a 1-L separable flask equipped with a stirring device under a nitrogen atmosphere, and were dissolved by stirring at a temperature of 70° C. 20 mL of acryloxypropyltriethoxysilane and 8 g of maleic anhydride were added thereto, and it was confirmed that they were completely dissolved. 15 mL of a toluene solution of 0.5 g of α,α'-azobisisobutyronitrile (AIBN) was added dropwise thereto over 2 hours, and graft copolymerization reaction was performed for 420 minutes. After completing the reaction, the total contents were recovered and then dried in the air, and further dried under reduced pressure at 85° C. for 24 hours, thereby providing 112 g of a graft copolymer. The characteristics thereof are shown in Table 2.

Example 4

Production of Graft Copolymer

The same procedures as in Example 1 were performed except that 70 g of the reactive polypropylene synthesized in Production Example 2 was used instead of 70 g of the reactive polypropylene synthesized in Production Example 1, thereby providing 78 g of a graft copolymer. The characteristics thereof are shown in Table 2.

TABLE 2

|  |  | Example | | | |
|---|---|---|---|---|---|
|  |  | 1 | 2 | 3 | 4 |
| Monomer unit amount (% by mol) | Butyl acrylate | 4.5 | — | — | 3.0 |
|  | Acrylic acid | — | 7.0 | — | — |
|  | Maleic anhydride | — | — | 2.2 | — |
|  | Silane-containing monomer | 0.5 | 0.4 | 0.7 | 0.3 |
| Limiting viscosity η (dL/g) |  | 0.39 | 0.35 | 0.42 | 0.39 |
| Weight average molecular weight |  | 45,000 | 45,000 | 47,000 | 43,000 |
| Molecular weight distribution |  | 2.8 | 3.3 | 3.5 | 2.8 |
| Graft rate (%) |  | 26 | 24 | 28 | 28 |
| Melting point (° C.) |  | 68.0 | 68.2 | 68.2 | 95.7 |

Evaluation of Performance of Reactive Hot-Melt Adhesive

Examples 5 to 8 and Comparative Examples 1 and 2

0.05 mL of dibutyltin dilaurate was added to 50 g of each of the polymers shown in Table 3, and the mixture was reacted under reduced pressure at 150° C. for 6 hours. The reaction product was evaluated for increase in viscosity before and after the reaction with a B-type viscosity measurement at 200° C. The evaluation results are shown in Table 3.

Measurement Method of B-type Viscosity
Viscometer: digital viscometer, Model DV-1+, produced by Brookfield Engineering, Inc.
Dedicated spindle: #34
Viscosity calibration standard liquid: JS160000, produced by Nippon Grease Co., Ltd.

With respect to the standard value 88,790 cP of the viscosity calibration standard liquid at 24.1° C., the viscosity measured with the dedicated spindle #34 was 90,000 cP at a specimen temperature of 24.1° C.

Examples 9 to 12 and Comparative Examples 3 and 4

The polymers shown in Table 4 each were mixed with oil (PW90) at a ratio of 70/30 (% by weight) and controlled to a prescribed viscosity, and the open time thereof was measured in the following manner.

According to JAI 7-1999, a composition was coated on a corrugated fiberboard A (width: 25 mm, length: 100 mm) as an adherend at 180° C. with a hot-melt tester (coater), and a corrugated fiberboard B (width: 25 mm, length: 100 mm) as an adherend was adhered thereto under pressure (load: 2 Kg), thereby preparing a test specimen. The specimen was broken by peeling to obtain the open time.

In Comparative Examples 2 and 4, a commercially available product A (a polypropylene based silane-modified amorphous resin composition, melting point: 107.2° C.) was used as the polymer.

TABLE 3

|  | Example | | | | Comparative Example | |
| --- | --- | --- | --- | --- | --- | --- |
|  | 5 | 6 | 7 | 8 | 1 | 2 |
| Polymer | Example 1 | Example 2 | Example 3 | Example 4 | Production Example 1 | Commercially available product A |
| Dibutyltin dilaurate | used | used | used | used | — | — |
| B-type viscosity at 200° C. (before reaction) | 5,200 | 5,200 | 5,200 | 5,500 | 11,000 | not melted |
| B-type viscosity at 200° C. (after reaction) | 12,000 | 15,000 | 22,000 | 24,000 | 11,000 | not melted |

TABLE 4

|  | Example | | | | Comparative Example | |
| --- | --- | --- | --- | --- | --- | --- |
|  | 9 | 10 | 11 | 12 | 3 | 4 |
| Polymer | Example 1 | Example 2 | Example 3 | Example 4 | Production Example 1 | Commercially available product A |
| Open time (sec) | ≧40 | ≧40 | ≧40 | ≧40 | <30 | incapable measurement |

INDUSTRIAL APPLICABILITY

The graft copolymer of the present invention is favorably used as a reactive hot-melt adhesive. The reactive hot-melt adhesive is excellent in adhesion strength between polyolefins and between a polyolefin and another member (for example, a metal, a resin, and an inorganic material, such as glass), is excellent in flowability at a low temperature and in melting property in a low temperature range, and is excellent in heat resistance after adhesion, and thus the reactive hot-melt adhesive is useful in various production processes that require adhesion of polyolefin.

The invention claimed is:

1. A graft copolymer, comprising:
(a) a main chain comprising, in reacted form, at least one monomer selected from the group consisting of (I) acrylic acid and a derivative thereof, (II) methacrylic acid and a derivative thereof, (III) a vinyl ester and a derivative thereof, (IV) styrene and a derivative thereof, and (V) a vinyl group comprising silane compound, whereby at least one of monomer (I)-(V) has a crosslinkable functional group;
(b) a side chain comprising, in reacted form, a reactive polyolefin having a meso pentad fraction (mmmm) of from 30 to 80% by mol and having an end unsaturated group in an amount of from 0.5 to 1.0 group per one molecule, the reactive polyolefin being a homopolymer of an α-olefin having from 3 to 28 carbon atoms, a copolymer of two or more α-olefins having from 3 to 28 carbon atoms, or a copolymer of 50% by mass or more of at least one α-olefin having from 3 to 28 carbon atoms and 50% by mass or less of ethylene,
wherein the graft copolymer has:
(c) a graft ratio of from 1 to 150% by mass;
(d) a weight average molecular weight of from 500 to 400,000 measured by GPC; and
(e) a molecular weight distribution (Mw/Mn) of from 1.5 to 4.

2. A graft copolymer, comprising:
(a') a main chain that is derived from at least one monomer selected from group A and at least one monomer selected from group B, wherein at least one monomer selected from the group consisting of group A and group B has a crosslinkable functional group;
wherein the group A monomer is selected from the group consisting of (VI) maleic anhydride and a substituted product thereof, (VII) maleic acid and an ester thereof, and (VIII) maleimide and a substituted product thereof;
wherein the group B monomer is selected from the group consisting of (I) acrylic acid and a derivative thereof, (II) methacrylic acid and a derivative thereof, (III) a vinyl ester and a derivative thereof, (IV) styrene and a derivative thereof, (V) a vinyl group-comprising silane compound, and (IX) an α-olefin;
(b) a side chain comprising, in reacted form, a reactive polyolefin having a meso pentad fraction (mmmm) of from 30 to 80% by mol and having an end unsaturated group in an amount of from 0.5 to 1.0 group per one molecule, the reactive polyolefin being a homopolymer of an α-olefin having from 3 to 28 carbon atoms, a copolymer of two or more α-olefins having from 3 to 28 carbon atoms, or a copolymer of 50% by mass or more of at least one α-olefin having from 3 to 28 carbon atoms and 50% by mass or less of ethylene,
wherein the graft copolymer has:
(c) a graft ratio of from 1 to 150% by mass;
(d) a weight average molecular weight of from 500 to 400,000 measured by GPC; and
(e) a molecular weight distribution (Mw/Mn) of from 1.5 to 4.

3. The graft copolymer according to claim 1, wherein the crosslinkable functional group is selected from the group consisting of a carboxylic acid group, a carboxylic anhydride group, a hydroxyl group, an amino group, an epoxy group, an isocyanate group, and an alkoxysilicon group.

4. The graft copolymer according to claim 1, wherein the reactive polyolefin is produced with a metallocene catalyst.

5. The graft copolymer according to claim 4, wherein the metallocene catalyst is a polymerization catalyst comprising a transition metal compound represented by formula (I)

wherein M represents a metal element of Groups 3 to 10 in Periodic Table or lanthanoid series; $E^1$ and $E^2$ each represent a ligand selected from the group consisting of a substituted cyclopentadienyl group, an indenyl group, a substituted indenyl group, a heterocyclopentadienyl group, a substituted heterocyclopentadienyl group, an amide group, a phosphide group, a hydrocarbon group, and a silicon-comprising group, and forms a crosslinked structure through $A^1$ and $A^2$, provided that $E^1$ and $E^2$ may be the same as or different from each other;

X represents a σ bonding ligand, provided that when there are plural groups of X, plural groups of X may be the same as or different from each other, and each may be crosslinked with the other group of X, $E^1$, $E^2$, or Y;

Y represents a Lewis base, provided that when there are plural groups of Y, plural groups of Y may be the same as or different from each other, and each may be crosslinked with the other group of Y, $E^1$, $E^2$ or X;

$A^1$ and $A^2$ each represents a divalent crosslinking group bonding two ligands, and represents a hydrocarbon group having from 1 to 20 carbon atoms, a halogen-comprising hydrocarbon group having from 1 to 20 carbon atoms, a silicon-comprising group, a germanium-containing group, a tin-comprising group, —O—, —CO—, —S—, —$SO_2$—, —Se—, —$NR^1$—, —$PR^1$—, —$P(O)R^1$—, —$BR^1$—, or —$AlR^1$—, wherein $R^1$ represents a hydrogen atom, a halogen atom, a hydrocarbon group having from 1 to 20 carbon atoms or a halogen-containing hydrocarbon group having from 1 to 20 carbon atoms, provided that $A^1$ and $A^2$ may be the same as or different from each other;

q represents an integer of from 1 to 5, which is ((atomic valence of M)-2); and r represents an integer of from 0 to 3.

6. A reactive hot-melt adhesive comprising the graft copolymer according to claim 1.

7. The reactive hot-melt adhesive according to claim 6, wherein the reactive hot-melt adhesive comprises a crosslinking agent having a functional group that reacts with the crosslinkable functional group of the graft copolymer in an amount of 2 or more groups per one molecule.

8. The reactive hot-melt adhesive according to claim 7, wherein the functional group of the crosslinking agent that reacts with the crosslinkable functional group of the graft copolymer is at least one selected from the group consisting of a carboxylic acid group, a carboxylic anhydride group, a hydroxyl group, an amino group, an isocyanate group, and an epoxy group.

9. The reactive hot-melt adhesive according to claim 8, wherein the crosslinkable functional group of the graft copolymer is an alkoxysilicon group.

10. The reactive hot-melt adhesive according to claim 9, wherein the reactive hot-melt adhesive comprises water and a curing catalyst.

11. The reactive hot-melt adhesive according to claim 6, wherein the reactive hot-melt adhesive comprises at least one selected from oil, a polyolefin resin, a tackifier, and an inorganic filler.

12. A reactive hot-melt adhesive comprising the graft copolymer according to claim 3.

13. The reactive hot-melt adhesive according to claim 12, wherein the reactive hot-melt adhesive comprises a crosslinking agent having a functional group that reacts with the crosslinkable functional group of the graft copolymer in an amount of 2 or more groups per one molecule.

14. The reactive hot-melt adhesive according to claim 13, wherein the functional group of the crosslinking agent that reacts with the crosslinkable functional group of the graft copolymer is at least one selected from the group consisting of a carboxylic acid group, a carboxylic anhydride group, a hydroxyl group, an amino group, an isocyanate group, and an epoxy group.

15. The reactive hot-melt adhesive according to claim 14, wherein the crosslinkable functional group of the graft copolymer is an alkoxysilicon group.

16. The reactive hot-melt adhesive according to claim 15, wherein the reactive hot-melt adhesive comprises water and a curing catalyst.

17. The reactive hot-melt adhesive according to claim 12, wherein the reactive hot-melt adhesive comprises at least one selected from oil, a polyolefin resin, a tackifier, and an inorganic filler.

18. The graft copolymer according to claim 1, wherein the main chain comprises, in reacted form, at least one monomer selected from the group consisting of (I) an acrylic acid, (II) a methacrylic acid, and (III) a vinyl ester.

19. The graft copolymer according to claim 1, wherein the main chain consists monomers selected from the group consisting of the (I) acrylic acid and a derivative thereof, (II) methacrylic acid and a derivative thereof, (III) a vinyl ester and a derivative thereof, (IV) styrene and a derivative thereof, and (V) a vinyl group comprising silane compound.

20. The graft copolymer according to claim 1, wherein the side chains are α-olefin homopolymers.

* * * * *